US008609015B2

(12) United States Patent
Sumi et al.

(10) Patent No.: US 8,609,015 B2
(45) Date of Patent: Dec. 17, 2013

(54) METHOD FOR FORMING RESIN MOLDED ARTICLES, APPARATUS FOR FORMING RESIN MOLDED ARTICLES, AND APPARATUS FOR ADJUSTING THICKNESS OF THERMOPLASTIC RESIN SHEET

(75) Inventors: Takehiko Sumi, Tokyo (JP); Shuji Ito, Yamato (JP); Tadatoshi Tanji, Yamato (JP)

(73) Assignee: Kyoraku Co., Ltd., Kyoto-shi, Kyoto (JP)

( * ) Notice: Subject to any disclaimer, the term of this patent is extended or adjusted under 35 U.S.C. 154(b) by 31 days.

(21) Appl. No.: 13/001,216

(22) PCT Filed: Jun. 24, 2009

(86) PCT No.: PCT/JP2009/002904
§ 371 (c)(1),
(2), (4) Date: Feb. 22, 2011

(87) PCT Pub. No.: WO2009/157197
PCT Pub. Date: Dec. 30, 2009

(65) Prior Publication Data
US 2012/0205038 A1    Aug. 16, 2012

(30) Foreign Application Priority Data
Jun. 25, 2008 (JP) .................................. 2008-166637

(51) Int. Cl.
*B29C 51/02* (2006.01)
(52) U.S. Cl.
USPC ....... 264/515; 264/545; 264/250; 264/177.17
(58) Field of Classification Search
USPC ............... 264/210.1, 177.14, 177.17, 177.19, 264/250, 263, 545; 425/233, 235, 388, 408
See application file for complete search history.

(56) References Cited

U.S. PATENT DOCUMENTS

| 7,153,458 B2 * | 12/2006 | Ide et al. ....................... 264/148 |
| 2005/0148677 A1 * | 7/2005 | Elsken et al. ................. 521/155 |

FOREIGN PATENT DOCUMENTS

| JP | 1154725 A | 6/1989 |
| JP | 3027922 A | 2/1991 |
| JP | 24347620 A | 12/1992 |
| JP | 11005248 A | 1/1999 |
| JP | 2000218682 A * | 8/2000 |
| JP | 2000318032 A | 11/2000 |

OTHER PUBLICATIONS

Endo, Haruhiro, JP 2000-218682 A, Machine Translation.*

* cited by examiner

*Primary Examiner* — Galen Hauth
(74) *Attorney, Agent, or Firm* — Westerman, Hattori, Daniels & Adrian, LLP

(57) ABSTRACT

There is provided a method for forming a resin molded article characterized by comprising the steps of melting and kneading a thermoplastic resin, storing a predetermined amount of the melted and kneaded thermoplastic resin, extruding the stored thermoplastic resin intermittently in a predetermined extrusion amount per unit time from an extrusion slit provided in a T-die and having a predetermined gap and sandwiching the sheet-shaped resin between a pair of rollers arranged below the extrusion slit and feeding the resin downward at a feeding speed higher than, or equal to the predetermined extrusion speed by rotary driving of the rollers, disposing the sheet-shaped molten resin, fed by the rollers, near a side of a mold arranged below the pair of rollers, and forming the sheet-shaped resin in a shape conforming to a shape of the mold.

25 Claims, 17 Drawing Sheets

METHOD FOR FORMING RESIN MOLDED ARTICLES, APPARATUS FOR FORMING RESIN MOLDED ARTICLES, AND APPARATUS FOR ADJUSTING THICKNESS OF THERMOPLASTIC RESIN SHEET

CROSS-REFERENCE TO RELATED APPLICATIONS

The present patent application is a nationalization of International application No. PCT/JP2009/002904, filed Jun. 24, 2009, published in Japanese, which is based on, and claims priority from, Japanese Patent Application No. JP 2008-166637, filed Jun. 25, 2008, both of which are incorporated herein by reference in their entireties.

TECHNICAL FIELD

The present invention relates to a method for forming a resin molded article, an apparatus for forming resin molded article, and an apparatus for adjusting a thickness of a thermoplastic resin sheet. More specifically, the present invention relates to a method for forming a resin molded article, an apparatus for forming resin molded article, and an apparatus for adjusting a thickness of a thermoplastic resin sheet using a thermoplastic resin which is extruded to droop downward in primary forming, and then formed in secondary forming.

BACKGROUND TECHNOLOGY

To manufacture a sandwich panel, for example, a conventionally used forming method employs primary forming (preforming) using extrusion, in combination with secondary forming using blow (or vacuum). According to such a forming method, an extruded molten resin is directly subjected to blow molding (or vacuum forming). This method thus makes it possible to form a sandwich panel without posing a technical problem such as non-uniform heating, which would otherwise be caused by reheating of an already formed resin. Particularly in this forming method, blow molding (or vacuum forming) is performed by causing an extruded molten resin to droop downward as it is, and then clamping the vertically extending resin. Therefore, it is not necessary to support the molten resin until clamping performed in the secondary forming, unlike in the case of, for example, extruding a resin laterally. It is thus possible to feed a resin in a non-contact state from an extrusion die. Such a forming technique is disclosed in, for example, Patent Documents 1 to 3.

Patent Document 1 discloses a method for forming a sandwich panel comprising two panel members and a foamed core member sandwiched between the two panel members wherein a pair of sheet-shaped resin s are extruded downward from an extrusion die to be disposed between a pair of split molds, while the foamed body having been already formed is disposed between the pair of sheet-shaped resins, and then, the split molds are clamped to carry out blow-molding.

More specifically, each of the pair of sheet-shaped resins extruded from an extrusion head and a decorative sheet are attached to each other using pressure by a pair of pressing rollers to form a decoration panel consisting of the sheet-shaped resin on its inner side and the decorative sheet on its outer side, and then, disposed between the split molds.

Patent Document 2 discloses a blow-molding technology wherein each of two synthetic resin sheets are extruded from a die to pass through a pair of mirror finished heat rollers so that its surface is made mirror finished, after which it is fed to a blow-molding mold, and then, pressurized air is supplied between two sheets to deform two sheets so as to conform to a forming space.

More specifically, a gap between the mirror finished heat rollers is narrowed to be slightly thinner than a thickness of a polypropylene sheet, while the mirror finished heat rollers are heated to 130° C., so that the sheet is thermally pressed by the fact that it is passed through the mirror finished heat rollers, whereby pressing marks on the surface of the sheet are distinguished, so that the surface of the sheet is modified so as to conform to the surface of the roller.

Patent Document 3 discloses a blow-molding technology wherein each of sheets is extruded from at least two dies connected to an extruding machine, after which each of sheets is sandwiched by a pair of rollers, while at least its surface is heated to extend its wrinkles to be glazed, and then, the at least glazed two sheets are pulled to be fed into a blow-molding mold, whereby the mold is clamped so that two sheets are attached to each other.

More specifically, both glazed sheets are fed into a blow-molding mold almost simultaneously by controlling a pulling speed of the sheet, or regulating the number of rotations of a screw of the extrusion machine, in accordance with a state of a draw-down of each sheet.

In this case, a draw-down phenomenon is defined to be the one in which an upper portion of a molten sheet becomes stretched, and thus, thinned more than a lower portion thereof due its own weight as time elapses, while a neck-in phenomenon is defined to be the one in which a width of the molten sheet becomes contracted in its widthwise direction, and thus, narrowed due to the draw-down phenomenon.

In each of the forming techniques disclosed in Patent Documents 1 to 3, a molten resin is allowed to pass through between a pair of rollers, before the molten resin extruded downward is formed within a mold. However, the pair of rollers disclosed in Patent Document 1 is merely pressure rollers for pressure-bonding a sheet-shaped resin extruded from an extrusion head to a decorative sheet. In the techniques disclosed in Patent Documents 2 and 3, on the other hand, a gap between the pair of rollers is set smaller than a thickness of a sheet-shaped molten resin. In addition, a temperature of the rollers is set close to that of the sheet-shaped molten resin. Under such conditions, the sheet-shaped resin is allowed to pass through between the pair of rollers to thereby be formed. It is thus possible to provide a mirrored or glossy surface of the sheet. In these conventional forming techniques, however, the molten resin extruded prior to secondary forming is caused to droop downward as it is. As a result, the following technical problems arise.

The first problem is that draw-down or neck-in, which occurs in a molten sheet, makes a thickness of the sheet prior to forming in a mold uneven in an extruding direction or a width direction of the sheet. When the sheet is finally formed by secondary forming using blow or suction (vacuum), the uneven thickness in the extruding direction of the sheet before the secondary forming affects a thickness of the finished sheet after the secondary forming. To cope with this problem, for example, when, during forming of the sheet, an extrusion speed of the sheet is changed to increase according to the draw-down as the forming proceeds, a thickness of the sheet corresponding to a later stage of the forming can be increased toward an upper part of the sheet. Therefore, it seems possible to cope with the thinning of the upper part of the sheet caused by the draw-down. However, the change in the extrusion speed of the sheet causes a change in an extrusion pressure of the sheet. As a result, a swelling in the molten resin extruded from an extrusion slit changes, which rather accelerates the unevenness of the sheet thickness. Note that Patent Document 3 discloses controlling a pulling speed of a sheet or adjusting a rotation speed of a screw of an extruder according to the draw-down of each sheet. However, this does not suppress or eliminate occurrence of the draw-down of each sheet. In this case, assuming that the draw-down occurs in two sheets, the pulling speed of the sheets is controlled or the rotation speed of the screw of the extruder is adjusted, and consequently, both of the sheets are merely supplied into a mold almost at the same time.

It is possible to prevent such draw-down or neck-in to some extent by employing, as the resin used for a sheet, the one having a predetermined or larger MFR value or melt tension value. In this case, however, materials that can be used are limited, which is not practical. Particularly when forming a thin sheet, the larger the MFR value, the better. For these reasons, limiting the MFR value may not solve the problem.

The documents that describe the related art are listed below.

Patent Document 1: JP 2000-218682 A
Patent Document 2: JP 3-27922 A
Patent Document 3: JP 11-5248 A

DISCLOSURE OF THE INVENTION

Problems to be Solved

In view of the technical problems described above, an object of the present invention is to provide a method for forming a resin molded article, a resin molded article forming apparatus, and an apparatus for adjusting a thickness of a thermoplastic resin sheet which are capable of preventing a draw-down or a neck-in phenomenon of a molten sheet-shaped thermoplastic resin extruded downwardly in a suspended manner without putting a restriction on the type of resin to be adopted.

Means to Solve Technical Problems

In order to achieve the above object, a method for forming a resin molded article according to an embodiment of the present invention includes the steps of: melting and kneading a thermoplastic resin; storing a predetermined amount of the melted and kneaded thermoplastic resin; extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed; and sandwiching the sheet-shaped resin between a pair of rollers arranged below the extrusion slit and feeding the resin downward at a feeding speed higher than, or equal to the predetermined extrusion speed by rotary driving of the rollers, in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin; disposing the sheet-shaped molten resin, fed by the rollers, near a side of a mold arranged below the pair of rollers; and forming the sheet-shaped resin in a shape conforming to a shape of the mold by depressurizing a sealed space formed between the sheet-shaped resin and the mold and/or pressurizing the sheet-shaped resin toward the mold.

According to the method for forming a resin molded article having the above configuration, a thermoplastic resin is extruded intermittently as a sheet-shaped molten resin by primary forming (extrusion molding). Continuously after the primary forming, the extruded sheet-shaped resin can be formed with a mold by secondary forming (blow molding or vacuum forming). More specifically, first, a predetermined amount of a melted and kneaded thermoplastic resin is stored. The stored thermoplastic resin is then intermittently extruded from an extrusion slit, which is provided in a T-die and has a predetermined gap, in a predetermined extrusion amount per unit time. Consequently, the thermoplastic resin is swollen to become a molten sheet and droops downward. At this time, the thermoplastic resin is extruded at a predetermined extrusion speed with a predetermined thickness. Then, a gap between a pair of rollers arranged below the extrusion slit is widened to be larger than the thickness of the sheet-shaped resin. As a result, a lowermost part of the sheet-shaped molten resin extruded downward is smoothly supplied between the pair of rollers. Next, the pair of rollers is caused to approach each other to narrow the gap therebetween, thereby sandwiching the sheet-shaped resin, which is then fed downward by the rotation of the rollers. At this time, while the sheet-shaped resin is supplied between the pair of rollers, a rotation speed of the rollers is adjusted such that a downward feeding speed of the sheet-shaped resin by the pair of rollers is set to be higher than, or equal to the extrusion speed of the sheet-shaped resin.

In this state, as the swollen sheet-shaped resin is fed downward by the pair of rollers, a length of the sheet-shaped resin drooping in the vertical direction increases. Accordingly, the drooping sheet-shaped resin becomes thinner toward an upper part thereof due to its own weight (draw-down or neck-in). Furthermore, the rotation speed of the rollers is adjusted such that the feeding speed by the pair of rollers becomes the extrusion speed or more. Thereby, the sheet-shaped resin is pulled downward by the pair of rollers, and is stretched and thinned. In this case, the rotation speed of the rollers is decreased with time, so that the feeding speed is adjusted to be close to the extrusion speed of the thermoplastic resin sheet. Consequently, a downward pulling force by the pair of rollers is reduced toward the upper part of the sheet-shaped resin, which relatively reduces the stretching and thinning caused by such a pulling force. Therefore, the thinning caused by the draw-down or neck-in can be canceled, and thus the draw-down or neck-in can be effectively prevented. This makes it possible to provide an even thickness in the extruding direction. Next, the sheet-shaped resin having an even thickness in the extruding direction is disposed between split mold blocks arranged below the pair of rollers. Then, the split mold blocks are clamped upon complete extrusion of a predetermined amount of the sheet-shaped resin. Then, air between the sheet-shaped resin and the split mold block is pressurized and/or depressurized to thereby form the sheet-shaped resin in a shape conforming to a shape of the mold. This makes it possible to form a resin molded article having a desired thickness in the extruding direction, without adversely affecting the forming in the secondary forming.

In another embodiment of the present invention, said feeding step by the rollers may comprise a step of varying the rotation speed of said rollers so as to set the feeding speed of said pair of rollers higher than, or equal to the predetermined extrusion speed of the sheet-shaped resin, in accordance with the predetermined extrusion speed, whereby the thickness of the sheet-shaped resin having passed through said pair of rollers is stretched and thinned so as to become thinner than, or equal to that of the sheet-shaped resin upon being extruded from the extrusion slit, in order for the thickness of the molten sheet-shaped resin disposed to be near the side of the mold to be formed to be substantially uniform in an extruding direction.

In another embodiment of the present invention, said feeding step by the rollers may comprise a step of adjusting a force pressing the sheet-shaped resin against the pair of rollers so as not to generate a slip between the surface of the pair of rollers and the sheet-shaped resin.

In another embodiment of the present invention, said extruding step may comprise a step of adjusting the thickness of the molten sheet-shaped resin by regulating a slit gap of the extruding die.

In another embodiment of the present invention, the extrusion speed is kept constant in said extruding step, and the rotating speed of the rollers is variable in said feeding step by the rollers.

In another embodiment of the present invention, said feeding step by the rollers may comprise a step of decreasing the rotation speed of the rollers monotonously.

In another embodiment of the present invention, the extrusion speed is variable, and the slit gap of the extrusion die is adjusted in accordance with the extrusion speed in said extruding step, and the rotation speed of the rollers is kept constant in said feeding step by the rollers.

In another embodiment of the present invention, the extrusion speed is variable, and the slit gap of the extrusion die is adjusted in accordance with the extrusion speed in said extruding step, and the rotation speed of the rollers is variable in said feeding step by the rollers.

In another embodiment of the present invention, said feeding step by the rollers may comprise a step of adjusting the rotation speed of the rollers, in accordance with the distribution of the thickness of the sheet-shaped resin in a feeding direction which is required in said forming step.

In another embodiment of the present invention, said feeding step by the rollers may comprise a step of adjusting the rotation speed of the rollers, in accordance with MFR value of the thermoplastic resin.

In another embodiment of the present invention, said step of adjusting the slit gap of the extrusion die in said extruding step and said step of adjusting the rotation speed of the rollers in said feeding step by the rollers are linked to each other.

In another embodiment of the present invention, said feeding step by said rollers may comprise a step of adjusting a gap between said pair of rollers so as not to generate a slip between the surfaces of said pair of rollers and the sheet-shaped resin.

In order to achieve the above object, a method for forming a resin molded article according to an embodiment of the present invention characterized by comprising the steps of: melting and kneading a first thermoplastic resin; storing a predetermined amount of the melted and kneaded first thermoplastic resin; extruding the stored first thermoplastic resin intermittently from a first T-die to droop downward in a shape of a molten sheet; and sandwiching the first sheet-shaped resin, extruded downward, between a first pair of rollers arranged below the first T-die and feeding the first sheet-shaped resin downward by rotary driving of the rollers; said feeding step comprises a step of adjusting the rotation speed of the rollers so as to set the feeding speed to be higher than, or equal to the extrusion speed of the first sheet-shaped resin, in accordance with the extrusion speed, the method further comprising the steps of: melting and kneading a second thermoplastic resin; storing a predetermined amount of the melted and kneaded second thermoplastic resin; extruding the stored second thermoplastic resin intermittently from a second T-die to droop downward in a shape of a molten sheet; and sandwiching the second sheet-shaped resin, extruded downward, between a second pair of rollers arranged below the second T-die and feeding the second sheet-shaped resin downward by rotary driving of the rollers; said feeding step comprises a step of adjusting the rotation speed of the rollers so as to set the feeding speed to be higher than, or equal to the extrusion speed of the second sheet-shaped resin, in accordance with the extrusion speed, the method further comprising the steps of: disposing the first and second sheet-shaped molten resins, fed by the first and second pairs of rollers, respectively, between split mold blocks arranged below the first and second pairs of rollers, and depressurizing air between one of the split mold blocks and the first sheet-shaped resin to cause the first sheet-shaped resin to closely adhere to a cavity of the one of the split mold blocks, while depressurizing air between the other of the split mold blocks and the second sheet-shaped resin to cause the second sheet-shaped resin to closely adhere to a cavity of the other of the split mold blocks, after which the split mold blocks are clamped, wherein, upon the clamping of the split mold blocks, the first and second sheet-shaped resins are integrally welded to each other by pinch-off forming portions on outer peripheries of the mold blocks to form a resin molded article having a sealed hollow portion.

In another embodiment of the present invention, the method for forming a resin molded article may further comprise a step of positioning a core member between the first sheet-shaped resin fed downwardly and the second sheet-shaped resin fed downwardly, and a step of clamping the first sheet-shaped resin fed downwardly, the second sheet-shaped resin fed downwardly and the positioned core member in a direction substantially perpendicular to the direction in which the resins are fed and disposing the core member within the sealed hollow portion with the core member being sandwiched between said first and second sheet-shaped resins.

In another embodiment of the present invention, said first sheet-shaped resin feeding step and said second sheet-shaped resin feeding step are carried out concurrently.

In another embodiment of the present invention, said disposing step may comprise a step of pressing the core member against either of the first or second molten thermoplastic sheet-shaped resin.

In another embodiment of the present invention, said pressing step may comprise a step of welding the core member to either of said first or second sheet-shaped resin.

In another embodiment of the present invention, said feeding step by the rollers may comprise a step of sandwiching a decorative sheet along with the thermoplastic sheet-shaped resin extruded downwardly between said pair of rollers to attach the decorative sheet to the sheet-shaped thermoplastic resin using pressure.

In another embodiment of the present invention, said core member is a cushion member made of a soft resin.

In another embodiment of the present invention, said core member is a strengthening member made of a rigid resin.

In order to achieve the above object, an apparatus for adjusting a thickness of a molten extruded thermoplastic sheet-shaped resin according to an embodiment of the present invention comprises a pair of rollers provided on a predetermined position below an extrusion die, a rotation shaft of each of which is disposed to be substantially horizontally parallel to each other, a means for rotary driving either of said pair of rollers, a means for adjusting a gap between said pair of rollers by moving the one of said pair of rollers relative to the other, or moving both rollers, in a plane encompassing said pair of rollers, and a means for adjusting a relative speed difference between the extrusion speed of the molten extruded thermoplastic sheet-shaped resin and the feeding speed of the molten thermoplastic sheet-shaped resin sandwiched between said pair of rollers.

According to the apparatus for adjusting a thickness of a sheet-shaped thermoplastic resin, the molten thermoplastic resin extruded from the extrusion die droops downward in a shape of a sheet to be fed between the pair of rollers positioned to be a predetermined position below the extrusion die.

The molted thermoplastic resin extruded from the extrusion die is caused to swell in accordance with an extrusion pressure. A gap between the pair of rollers is adjusted by the gap adjusting means, in accordance with the thickness of the swollen sheet-shaped resin.

In this case, the gap between the pair of rollers is set so as not to generate a slip in the rotary direction of the rollers between the surface of the roller and the surface of the sheet-shaped resin when the swollen sheet-shaped resin passes through the pair of rollers.

The swollen sheet-shaped resin is fed downwardly by the pair of rollers with it being sandwiched by the pair of rollers after it is fed between the pair of rotating rollers by means of the rotary driving means.

While the swollen sheet-shaped resin is fed between the pair of rollers, a relative speed difference between the extrusion speed of the extruded molten sheet-shaped thermoplastic resin and the downward feeding speed of the molten sheet-shaped thermoplastic resin sandwiched between the pair of rollers is adjusted by the relative speed difference adjusting means.

More specifically, as the swollen sheet-shaped resin is fed downwardly by the pair of rollers, a length of the sheet-shaped resin drooping downward is lengthened, so that an upper portion of the drooping sheet-shaped resin is more thinned than a lower portion thereof due to its weight (draw-down, or neck-in phenomenon). While on the other hand, the sheet-shaped resin is pulled downwardly by the pair of rollers by adjusting the feeding speed by the pair of rollers so as to set the feeding speed to be higher than, or equal to the extrusion speed, whereby the sheet-shaped resin is stretched, and thus, thinned.

In such a case, the feeding speed is adjusted so as to become close to the extrusion speed of the sheet-shaped resin by gradually lowering the rotary speed of the pair of rollers by means of the relative speed difference adjusting means. Since this causes the upper portion of the sheet-shaped resin to be pulled downwardly less by the pair of rollers, the upper portion is less stretched, and thus, less thinned than the lower portion, whereby the draw-down or the neck-in phenomenon can be effectively prevented from being generated by cancelling the thinning by the draw-down or the neck-in phenomenon, thereby causing the sheet-shaped resin with an uniform thickness in the extruding direction to be formed.

In another embodiment of the present invention, said relative speed difference adjusting means may comprise a means for adjusting a rotation speed of the driving roller in accordance with the extrusion speed of the sheet-shaped thermoplastic resin, so as to set said feeding speed higher than, or equal to said extrusion speed while the sheet-shaped thermoplastic resin is kept sandwiched between said pair of rollers.

In another embodiment of the present invention, said apparatus may further comprise a means for adjusting the surface temperature of the pair of rollers so as to set it to be lower than, or equal to the surface temperature of molten extruded sheet-shaped thermoplastic resin by the predetermined degrees.

In another embodiment of the present invention, the one of said pair of rollers is a rotary driving roller, and the other thereof is a rotary driven roller, and said apparatus further comprises means for transmitting a driving force so as to rotate said pair of rollers in a synchronized manner.

In order to achieve the above object, an apparatus for forming a thermoplastic resin according to an embodiment of the present invention comprises a pre-forming portion which pre-forms a thermoplastic resin by extrusion molding, and then extrudes pre-formed thermoplastic resin in a suspended manner, and a forming portion which forms the extruded thermoplastic resin by the pre-forming portion by blow molding or vacuum forming, said pre-forming portion comprises a means for melting and kneading a thermoplastic resin; a means for storing a predetermined amount of the melted and kneaded thermoplastic resin; and an extrusion slit which extrudes the stored thermoplastic resin intermittently to droop downward in a shape of a molten sheet; said forming portion comprises a pair of split molds which are movable between an open position and a close position in a direction substantially perpendicular to the sheet surface with the drooped thermoplastic sheet-shaped resin being sandwiched therebetween, and each of which forms a cavity on a surface opposed to each other, a means for moving said pair of molds between the open position and the close position in a direction substantially perpendicular to the sheet surface, a pair of rollers which are positioned to be below the extrusion die and above said pair of split molds, and rotation shafts of which are disposed substantially horizontal and parallel to each other, and the one of which is a rotary driving roller and the other of which is a rotary driven roller, a means for rotary driving said rotary driving roller, a means for moving the one of said pair of rollers relative to the other, or moving both rollers, in a plane encompassing said pair of rollers, a means for adjusting the surface temperature of said pair of rollers, and a means for adjusting a rotation speed of the driving roller in accordance with the extrusion speed of the sheet-shaped thermoplastic resin, so as to set said feeding speed higher than, or equal to said extrusion speed while the sheet-shaped thermoplastic resin is kept sandwiched between said pair of rollers.

In another embodiment of the present invention, said roller moving means may consist of a piston-cylinder mechanism which functions to adjust a gap between said pair of rollers, in accordance with a thickness of the molten extruded sheet-shaped resin.

In another embodiment of the present invention, said roller moving means may consist of a piston-cylinder mechanism which functions to adjust a force pressing sheet-shaped thermoplastic resin passing through said pair of rollers against said pair of rollers.

In another embodiment of the present invention, said rotary driven roller may comprise a first gear which is provided on its end peripheral surface and is rotatable about its rotation shaft, said rotary driving roller comprises a second gear which is provided on its end peripheral surface and is rotatable about its rotation shaft and mates with said first gear, whereby said rotary driven roller is rotary driven in a manner synchronized with said rotary driving roller.

In another embodiment of the present invention, the outer surface of the rotary driving roller is covered by a thermal resistance resin.

In another embodiment of the present invention, a pair of helical shallow grooves, each of which are oriented so as to guide the sheet-shaped resin toward a corresponding end of said rotary driving roller when the sheet-shaped resin is fed downwardly by said pair of rollers are provided on an outer peripheral surface of said rotary driving roller.

In another embodiment of the present invention, said roller surface temperature adjusting means may set the surface temperature of said pair of rollers lower than, or equal to that of the outer surface of the molten sheet-shaped resin extruded toward said pair of rollers by the predetermined degree.

Effect of the Invention

According to the method for forming a resin molded article of the present invention, by adjusting a rotation speed of the rollers such that a downward feeding speed of the sheet-shaped resin by the pair of rollers is set to be higher than, or equal to the extrusion speed of the sheet-shaped resin, although the sheet-shaped resin is pulled downward by the pair of rollers, and is stretched and thinned, the rotation speed of the rollers is decreased with time, so that the feeding speed is adjusted to be close to the extrusion speed of the thermoplastic resin sheet. Consequently, a downward pulling force by the pair of rollers is reduced toward the upper part of the sheet-shaped resin, which relatively reduces the stretching and thinning caused by such a pulling force. Therefore, the thinning caused by the draw-down or neck-in can be canceled, and thus the draw-down or neck-in can be effectively prevented. This makes it possible to provide an even thickness in the extruding direction.

PREFERRED EMBODIMENTS OF THE INVENTION

A resin molded article forming apparatus according to a first embodiment of the present invention will be described in detail below with reference to the accompanying drawings. A resin molded article according to this embodiment is a single sheet-shaped molded article. As shown in FIG. 1, a resin molded article forming apparatus 10 includes an extruder 12 and a clamping device 14 arranged below the extruder 12. The forming apparatus 10 feeds a sheet-shaped molten resin P, which is extruded from the extruder 12, to the clamping device 14 which then forms the sheet-shaped molten resin P.

The extruder 12 is of a conventionally known type, and the detailed description thereof will be omitted. The extruder 12 includes a cylinder 18 provided with a hopper 16, a screw (not shown) installed inside the cylinder 18, a hydraulic motor 20 coupled to the screw, an accumulator 24 whose inside is in communication with the cylinder 18, and a plunger 26 inserted into the accumulator 24. In the extruder 12, resin pellets supplied through the hopper 16 are melted and kneaded inside the cylinder 18 by the screw rotated by the hydraulic motor 20. After that, the molten resin is transferred to the accumulator 24, where a predetermined amount of the resin is stored. The molten resin is then fed to a T-die 28 by being driven by the plunger 26, after which a sheet-shaped resin P in the shape of a continuous sheet is extruded through an extrusion slit 34. The resin P is then fed downward to droop between split mold blocks 32, while being nipped and pressed between a pair of rollers 30 arranged with a gap therebetween. In this manner, as will be described in detail later, the sheet-shaped resin P in the shape of a sheet is disposed between the split mold blocks 32 while having an even thickness in a vertical (extruding) direction.

An extrusion performance of the extruder 12 is appropriately selected from the viewpoints of the size of a resin molded article to be formed, and prevention of draw-down or neck-in of the sheet-shaped resin P. More specifically, from the practical point of view, an extrusion amount per one shot in intermittent extrusion is preferably 1 to 10 kg. An extrusion speed of the resin from the extrusion slit 34 is several hundred kg/hour or more, preferably 700 kg/hour or more. Also, from the viewpoint of preventing draw-down or neck-in of the sheet-shaped resin P, an extrusion step of the sheet-shaped resin P is preferably done as quickly as possible. Generally, the extrusion step is preferably finished within 40 seconds, more preferably within 10 to 20 seconds, though depending on a type, an MFR value and a melt tension value of the resin. Therefore, the extrusion amount of a thermoplastic resin from the extrusion slit 34 per unit area and unit time is 50 kg/cm$^2$ per hour or more, preferably 150 kg/cm$^2$ per hour or more. For example, a thermoplastic resin with a density of 0.9 g/cm$^3$ is extruded as the sheet-shaped resin P in the shape of a sheet, having a thickness of 1.0 mm, a width of 1000 mm and a length in the extruding direction of 2000 mm, in 15 seconds from the extrusion slit 34 of the T-die 28 having a slit gap of 0.5 mm and a slit length in the width direction of 1000 mm. In this case, 1.8 kg of the thermoplastic resin is extruded in one shot of 15 seconds. The extrusion speed, and the extrusion speed per unit area can be calculated to be 432 kg/hour and about 86 kg/cm$^2$ per hour, respectively.

As will be described later, the sheet-shaped resin can be stretched and thinned, by being sandwiched between the pair of rollers 30 and fed downward by the rotation of the pair of rollers 30. It is possible to prevent the draw-down or neck-in by adjusting a relationship between the extrusion speed of the extruded sheet-shaped resin and the feeding speed of the sheet-shaped resin by the pair of rollers 30. Therefore, it is possible to alleviate the restriction on the type of resin (particularly, the MFR value and the melt tension value) or the extrusion amount per unit time.

As shown in FIG. 1, the extrusion slit 34 provided in the T-die 28 is arranged vertically downward. A continuous sheet-shaped resin extruded from the extrusion slit 34 is fed vertically downward as it is to droop from the extrusion slit 34. As will be described later, when a gap of the extrusion slit 34 is variable, the thickness of the sheet-shaped resin P in the shape of a continuous sheet can be changed.

As shown in FIG. 2 (the left part thereof corresponds to the downward direction in FIG. 1), a body of the T-die 28 is constituted by putting together a die 38a having a die lip 36a at a leading end thereof, and a die 38b having a die lip 36b at a leading end thereof. A gap between the die lips 36a and 36b defines the gap of the extrusion slit 34. A slit gap adjusting device 42 and a slit gap driving device 44 are provided in order to adjust the gap of the extrusion slit. Recessed grooves 56a and 56b are formed near the die lips 36a and 36b, respectively, which makes the die lips 36a and 36b readily flexible in the vertical direction in FIG. 2. In this manner, each of the slit gap adjusting device 42 and the slit gap driving device 44 adjusts the gap of the extrusion slit 34. The slit gap adjusting device 42 and the slit gap driving device 44 each have a known configuration. However, the slit gap adjusting device 42 functions to deform the die lip 36a and adjust the evenness of the thickness in the width direction (front-rear direction in FIG. 2) of the sheet. On the other hand, the slit gap driving device 44 functions to deform the die lip 36b and adjust the thickness in the extruding direction (left-right direction in FIG. 2) of the sheet. The thermoplastic resin supplied to the T-die 28 flows from a manifold of the body of the T-die 28 shown in FIG. 2 through a resin flow path 33, and is then extruded from the extrusion slit 34 in the shape of a sheet.

The slit gap adjusting device 42 is of either a thermal expansion type or a mechanical type, and preferably has functions of both the types. A plurality of slit gap adjusting devices 42 is arranged at equal intervals along the width direction of the extrusion slit 34. Each slit gap adjusting device 42 makes the thickness of the sheet in the width direction even by narrowing or widening a slit gap A.

Each slit gap adjusting device 42 comprises a die bolt 46, an adjusting shaft 50 connected to the die bolt 46, an engaging piece 54 connected to the adjusting shaft 50 through a screw bolt 52. Each slit gap adjusting device 42 is provided so as to stride a groove 56a by the die bolt 46, the adjusting shaft 50 and the engaging piece 54. More specifically, Each slit gap adjusting device 42 includes the die bolt 46 which is movable toward or away from the other die lip 36a and includes at its tip end the adjusting shaft 50 via a pressure transmitting portion. The engaging piece 54 is provided on the adjusting shaft 50 by the screw bolt 52 to be connected to the other die lip 36a. When the die bolt 46 is advanced, the adjusting shaft 50 is extruded toward its tip end by the pressure transmitting portion to press the other die lip 36a. This causes a portion of the die lip 36a where the groove 56a is provided to be deformed, thereby causing the slit gap A to be narrowed. The die bolt has to be backed in order to widen the slit gap A.

Further, the slit gap A can be adjusted with a better accuracy by utilizing an adjusting means of a thermal expansion type in addition to the above mechanical adjusting means. More specifically, the one die lip 36a is pressed by heating, and thus thermally expanding the adjusting shaft 50 by a heater (not shown), so that the slit gap A is narrowed. While on the other hand, the heater is turned off in order to widen the slit gap A, and the adjusting shaft 50 is cooled by a cooling means (not shown) to be contracted.

A slit gap adjusting device 44 comprises a sliding bar 58 and a driving piece 60. The sliding 58 is disposed to be inside the sliding groove 62 and is movable in the widthwise direction of the slit by a below-described driving means. The driving piece 60 is connected to the other die lip 36b. When the sliding bar 48 is advanced in the widthwise direction of the slit, this causes the driving piece 60 to press and pull the other die lip 36b. This causes a portion of the die lip 36b where the groove 56b is provided to be deformed to vary the slit gap A.

It is preferable that the thickness of the sheet extruded from the T-die 28 be adjusted so as to be uniform in the extruding direction when the sheet droops between the split mold blocks 32, that is, when the split mold blocks 32 are clamped. In this case, the slit gap A is varied so as to gradually be widened from the start of the extrusion to be maximized when the extrusion is completed. Although this causes the thickness of the sheet extruded from the T-die 28 to be gradually thickened from the start of the extrusion, since the extruded molten sheet is stretched due to its weight, so that the thickness of the sheet is gradually thinned from its upper portion to its lower portion, the thickness of the sheet can be uniform from its upper portion to its lower portion by setting the thickened extruded portion by the widening of the slit gap A against the stretched thinned portion by the draw-down phenomenon.

FIGS. 3 to 5 are views each illustrating an aspect of the slit gap driving device. The left-right direction in each of FIGS. 3 to 5 corresponds to the front-rear direction in FIG. 2. The die lip (not shown) is located in the lower part of each of FIGS. 3 to 5. The die 38b on the other side includes a slide groove 62, which accommodates a sliding bar 58 and serves as a movable guide for the sliding bar 58, in parallel with the die lip 36. In addition, protrusions 64 are provided on the sliding bar 58. Slanted grooves 66 shown by a dashed line are formed in a driving piece 60 also shown by a dashed line. The slanted groove 66 has a predetermined length with an inclined angle with respect to a moving direction of the sliding bar 58. The protrusion 64 on the sliding bar 58 is engaged with the slanted groove 66. When the sliding bar 58 is slid along the slide groove 62, the protrusion 64 is pressed against walls of the slanted groove 66. Consequently in this structure, the driving piece 60 is moved in a direction perpendicular to the moving direction of the sliding bar 58.

More specifically, when the sliding bar 58 is slid to the right in FIG. 3 by a below-described driving means, the protrusion 64 provided on the sliding bar 58 presses a wall surface of the slanted groove 66 at the side of the die lip 36 (a wall surface at the lower side in FIG. 3) to move the driving piece 60 toward the other die lip 36b (downward direction in FIG. 3). This causes a force to be transmitted to the other die lip 36b connected to the driving piece 60, whereby the other die lip 36b is deformed so as to narrow the slit gap A. In contrast with this, when the sliding bar 58 is slid to the left in FIG. 3 by the below-described driving means, the protrusion 64 provided on the sliding bar 58 presses a wall surface of the slanted groove 66 at the side apart from the die lip 36 (a wall surface at the upper side in FIG. 3) to move the driving piece 60 toward the side opposite to the other die lip 36b (upward direction in FIG. 3). This causes the other die lip 36b connected to the driving piece 60 to be deformed so as to widen the slit gap A. The adjustment of the thickness of the sheet in the extruding direction can be attained by linking the above operations to the extruding operation of the thermoplastic resin fed from the accumulator 24 to the T-die 28.

Although any driving means may be selected so long as it can move the sliding bar 58 in the right and the left direction in FIG. 3, an actuator may be preferable in view of a pressing force and a feeding accuracy. For instance, in a case where a driving force in the rotary direction by a AC servo motor 68 is used as a driving source, a ball screw 72 may be rotated via a reduction unit 70 with a high accuracy with a reduction ratio about 1/64. A slide block 76 integral with a ball nut 74 may be provided on the ball screw 72, so that the rotation of the ball screw 72 may be converted into a driving force in the widthwise direction of the die lip 36. The sliding bar 58 is fixed on the slide block 76 via a bracket 80 by a screw bolt 81. The sliding bar 58 can be moved in the right and the left direction in FIG. 3 by the fact that the slide block 76 moves along a guide bar 78.

FIG. 4 shows an alternative driving means. As shown in FIG. 4, in a case where the driving force in the straight direction by a hydraulic cylinder 82 is used as a driving source, the hydraulic cylinder 82 can be disposed to be parallel to the direction in which the sliding bar 58 moves, so that the driving force is directly transmitted to the sliding bar 58. The stroke of the hydraulic cylinder 82 can be adjusted with a high accuracy by a position sensor 84. A sliding block 76 is integrally fixed to the tip end of the piston rod 86 of the hydraulic cylinder 82. A sliding bar 58 is fixed on the sliding block 76 via a bracket 80 by a screw bolt 81. The sliding bar 58 can be moved in the right and the left direction in FIG. 4 by the fact that the sliding block 76 moves along the guide bar 78.

FIG. 5 shows another alternative driving means. A rotatable nut 90 is provided inside a nut housing 88 so that a shaft screw 92 welded to the sliding bar 58 is mated with an inner screw of the nut 90. A rotatable adjustable bolt can be rotated by a driving source 93 such as a rotary belt by linking the nut 90 to the adjustable bolt. This causes the sliding bar 58 to be moved in the right and the left directions in FIG. 5 via the shaft screw 92 by the rotation of the nut 90.

The pair of rollers 30 will be described with reference to FIGS. 6A and 6B. The pair of rollers 30 is arranged below the extrusion slit 34 with rotation axes thereof being in parallel to each other and substantially horizontal. One of the rollers is a rotary driving roller 30A, and the other is a rotary driven roller 30B. More specifically, as shown in FIG. 1, the pair of rollers 30 is arranged in line symmetry with respect to the sheet-shaped resin extruded from the extrusion slit 34 to droop downward. A diameter of each roller and an axial length of the rollers can be appropriately set according to the extrusion speed of a sheet-shaped resin to be formed, a length in the extruding direction and a width of the sheet, the type of resin, and the like. As will be described later, however, preferably the diameter of the rotary driving roller 30A is slightly larger than that of the rotary driven roller 30B, for the purpose of smoothly feeding the sheet-shaped resin downward by the rotation of the pair of rollers 30 while sandwiching the sheet-shaped resin therebetween. The diameter of the roller is preferably in the range of 50 to 300 mm. Too large or small a curvature of the roller causes a trouble in which the sheet-shaped resin is wound around the roller upon contact therewith.

The rotary driving roller 30A is provided with a roller rotary driving unit 94 and a roller moving unit 96. The roller rotary driving unit 94 enables the rotary driving roller 30A to rotate about the axial direction thereof. The roller moving unit 96, on the other hand, enables the rotary driving roller 30A to move toward or away from the rotary driven roller 30B while maintaining the parallel position with the rotary driven roller 30B, in a plane including the pair of rollers 30.

More specifically, the roller rotary driving unit 94 is a rotary driving motor 98 coupled to the rotary driving roller 30A, and a rotary torque of the rotary driving motor 98 is transmitted to the rotary driving roller 30A via, for example, a gear reduction mechanism (not shown). The rotary driving motor 98 is conventionally known. The rotary driving motor 98 is provided with a rotation speed adjusting device 100 to adjust the rotation speed of the motor 98. The rotation speed adjusting device 100 may be of a type which, for example, adjusts a value of current supplied to an electric motor. As will be described later, the rotation speed adjusting device 100 adjusts, according to the extrusion speed of the sheet-shaped resin, a relative difference in speed between the extrusion speed of the sheet-shaped resin extruded from the extruded slit 34 and the feeding speed of the sheet-shaped resin fed downward by the rotation of the pair of rollers 30. For example, when the pair of rollers each having a diameter of 100 mm is used to feed the sheet-shaped resin P having a length in the feeding direction of 2000 mm in 15 seconds, the feeding speed of the sheet-shaped resin P by the rollers corresponds to about 6.4 rotations of the rollers in one shot of 15 seconds. Therefore, the rotation speed of the rollers can be calculated to be about 25.5 rpm. The feeding speed of the sheet-shaped resin P can easily be adjusted by increasing or decreasing the rotation speed of the rollers.

As shown in FIG. 7, the rotary driven roller 30B includes, around a peripheral surface 102 at an end thereof, a first gear 104 rotatable about the rotation axis of the roller. On the other hand, the rotary driving roller 30A includes, around a peripheral surface 106 at an end thereof, a second gear 108 which is rotatable about the rotation axis of the roller and meshes with the first gear 104. Consequently, the rotary driven roller 30B is driven to rotate in synchronization with the rotary driving roller 30A. As shown in FIGS. 6A and 6B, the roller moving unit 96 includes a piston-cylinder mechanism 97. A leading end of a piston rod 109 is coupled to a cover 111 which supports the rotary driving roller 30A rotatably in the axial direction thereof. The rotary driving roller 30A is moved horizontally by sliding a piston 113 along a cylinder 115 by means of, for example, adjustment of air pressure. This makes it possible to adjust the gap between the pair of rollers 30. In this case, as will be described later, the gap between the pair of rollers 30 is widened to be larger than the thickness of the supplied sheet-shaped resin (an opened position forming a gap D1 shown in FIG. 6A) before a lowermost part of the sheet-shaped resin is supplied between the pair of rollers 30. In this manner, the sheet-shaped resin is smoothly supplied between the pair of rollers 30. After that, the gap between the pair of rollers 30 is narrowed to sandwich the sheet-shaped resin therebetween (a closed position forming a gap D2 shown in FIG. 6B), and the sheet-shaped resin is fed downward by the rotation of the rollers. A stroke of the piston 113 only needs to be set to correspond to a distance between the opened position and the closed position. The pressing force of the rollers acting on the sheet-shaped resin can be adjusted by adjusting the air pressure, when the sheet-shaped resin passes through between the pair of rollers 30. A range of the pressing force is determined such that the sheet-shaped resin is reliably fed downward, without causing a slip between the surfaces of the pair of rollers 30 and the surfaces of the sheet-shaped resin while preventing the sheet-shaped resin from being torn apart by the pair of rollers 30, due to the rotation thereof. The range of the pressing force depends on the type of resin and is, for example, 0.05 MPa to 6 MPa.

A pair of helical shallow grooves 112 is provided on the outer peripheral surface of the rotary driving roller 30A, each of which is oriented so as to guide the sheet-shaped resin toward its corresponding end when the sheet-shaped resin is fed downwardly by the rotation of the pair of rollers 30. This causes the sheet-shaped resin to be stretched in the direction in which the width of the sheet-shaped resin is widened by the sheet-shaped resin passing through the pair of rollers 30. The pitch and the depth of each of the pair of helical shallow grooves 112 may be appropriately determined in accordance with the material of the sheet-shaped resin, the rotation speed of the rollers, etc. In this connection, the pitch of the shallow grooves 112 in FIG. 7 is depicted in an exaggerated manner so as to ease the understanding thereof.

A means for adjusting the surface temperature of the rollers in accordance with the temperature of the sheet-shaped resin may be provided on the rotary driving roller 30A. More specifically, a coolant may be flowed inside the rollers to be circulated, for instance, so that a thermal exchange between the coolant and the molten sheet-shaped resin sandwiched between the pair of rollers 30 can be conducted so as not to overheat the surface of the rollers due to the molten sheet-shaped resin. In this connection, the outer peripheral surface of the rollers may be covered by thermal resistance material.

The clamping device 14 is also of a conventionally known type, like the extruder 12, and the detailed description thereof will be omitted. The clamping device 14 includes two split mold blocks 32A and 32B, and a mold driving device which moves the mold blocks 32A and 32B between an opened position and a closed position in a direction substantially perpendicular to the direction of supplying the sheet-shaped molten resin P.

As shown in FIG. 1, the two split mold blocks 32A and 32B are arranged with cavities 116 thereof facing each other. Each of the cavities 116 is formed in a substantially vertical direction. Irregularities are formed on a surface of each of the cavities 116 according to an outer shape and a surface shape of a molded article formed from the sheet-shaped molten resin P. A pinch-off portion 118 is formed around the cavity 116 in each of the two split mold blocks 32A and 32B. The pinch-off portion 118 is formed in an annular shape around the cavity 116 and protruded toward the opposite mold block 32A or 32B. Consequently, when the two split mold blocks 32A and 32B are clamped, leading end portions of the pinch-off portions 118 abut against each other, forming a parting line PL on a peripheral edge of the sheet-shaped molten resin P. Note that when a single sheet-shaped resin molded article is formed, a single mold may be used, instead of using the split mold blocks and clamping them. In this case, the extruded sheet-shaped resin P is disposed near a side of the single mold. Then, without clamping, the sheet-shaped resin is formed in a shape conforming to a shape of the mold by depressurizing a sealed space formed between the sheet-shaped resin and the mold, and/or pressurizing the sheet-shaped resin toward the mold.

Mold frames 33A and 33B are slidably fitted onto outer peripheral portions of the two split mold blocks 32A and 32B, respectively. A mold frame moving device (not shown) enables the mold frames 33A and 33B to move relative to the mold blocks 32A and 32B, respectively. More specifically, when the mold frame 33A protrudes toward the mold block 32B from the mold block 32A, the mold frame 33A can abut against one side surface of the sheet-shaped resin P disposed between the mold blocks 32A and 32B. When the mold frame 33B protrudes toward the mold block 32A from the mold block 32B, the mold frame 33B can abut against the other side surface of the sheet-shaped resin P disposed between the mold blocks 32A and 32B.

The mold driving device is of a conventional type, and the description thereof will be omitted. The two split mold blocks 32A and 32B are each driven by the mold driving device. In the opened position, the continuous sheet-shaped molten resin P can be disposed between the two split mold blocks 32A and 32B. In the closed position, on the other hand, the annular pinch-off portions 118 of the two split mold blocks 32A and 32B abut against each other, thereby forming a sealed space between the two split mold blocks 32A and 32B. Note that, as to the movement of the mold blocks 32A and 32B from the opened position to the closed position, a center line of the continuous sheet-shaped molten resin P defines the closed position, toward which the mold blocks 32A and 32B move by being driven by the mold driving device.

As shown in FIG. 9, a vacuum suction chamber 120 is provided inside one of the split mold blocks 32. The vacuum suction chamber 120 is in communication with the cavity 116 through suction holes 122. The sheet-shaped resin is adsorbed onto the cavity 116 to be formed into the shape conforming to the outer surface of the cavity 116, by being sucked by the vacuum suction chamber 120 through the suction holes 122.

The sheet-shaped resin P is a sheet made of polypropylene, engineering plastics, olefin-based resin, or the like. More specifically, the sheet-shaped resin P is preferably made of a resin material having a high melt tension, from the viewpoint of preventing uneven thickness which would be caused by draw-down, neck-in or the like. It is preferable, from another point of view, to use a resin material having a high fluidity for improving conformity to the mold. Specific examples of the material used include polyolefin (e.g., polypropylene and high-density polyethylene), which is a homopolymer or copolymer of olefins such as ethylene, propylene, butene, isoprene pentene and methylpentene. This material has an MFR at 230° C. (measured according to JIS K-7210 under the conditions of a test temperature of 230° C. and a test load of 2.16 kg) of 3.0 g/10 minutes or less, preferably 0.3 to 1.5 g/10 minutes. Another example is an amorphous resin such as an acrylonitrile-butadiene-styrene copolymer, polystyrene, high-impact polystyrene (HIPS resin) or an acrylonitrile-styrene copolymer (AS resin). This material has an MFR at 200° C. (measured according to JIS K-7210 under the conditions of a test temperature of 200° C. and a test load of 2.16 kg) of 3.0 to 60 g/10 minutes, preferably 30 to 50 g/10 minutes, and a melt tension at 230° C. (a tension measured using a melt tension tester manufactured by Toyo Seiki Seisaku-Sho, Ltd., by extruding a strand from an orifice having a diameter of 2.095 mm and a length of 8 mm at a residual heat temperature of 230° C. and an extrusion speed of 5.7 mm/minute, and then winding the strand around a roller having a diameter of 50 mm at a winding speed of 100 rpm) of 50 mN or more, preferably 120 mN or more.

In order to prevent cracks from being generated on the skin sheet 12, less than 30 wt %, more preferably, less than 15 wt % of hydrogenated styrene thermoplastic elastomer may be added. More specifically, a mixture of a block copolymer of styrene ethylene butylene styrene, a block copolymer of styrene-ethylene•propylene-styrene, and hydrogenated styrene-butadiene rubber may be preferable for hydrogenated styrene of the thermoplastic elastomer. Less than 30 wt %, more preferably, less than 20 wt % of styrene may be contained, and the value of MFR (which is measured at a temperature of 230° C. under the test load of 2.16 kg pursuant to JIS K-7210) may be between 1.0 and 10 g/10 min, more preferably, between 1.0 and 5.0 g/10 min.

In addition, the sheet-shaped resin P may contain an additive. Examples of the additive include inorganic fillers such as silica, mica, talc, calcium carbonate, glass fiber and carbon fiber; a plasticizer, a stabilizer, a colorant, an antistatic agent, a flame retardant, and a foaming agent. Specifically, silica, mica, glass fiber and the like are added in an amount of 50 wt % or less, preferably 30 to 40 wt %, with respect to a formed resin.

The operation of the resin molded article forming apparatus 10 having the above configuration will be described below with reference to the drawings. First, a predetermined amount of a melted and kneaded thermoplastic resin is stored in the accumulator 24. The stored thermoplastic resin is intermittently extruded from the extrusion slit 34 provided in the T-die 28 and having a predetermined gap, in a predetermined extrusion amount per unit time. In this manner, the thermoplastic resin is extruded at a predetermined extrusion speed while having a predetermined thickness, so that the thermoplastic resin is swollen to become a sheet-shaped molten resin and droops downward, or in a suspended manner.

Next, a piston-cylinder mechanism 96 is driven to thereby move the pair of rollers 30 to the opened position, as shown in FIG. 6A. The gap between the pair of rollers 30 arranged below the extrusion slit 34 is widened to be larger than the thickness of the sheet-shaped resin. Consequently, a lowermost part of the sheet-shaped molten resin extruded downward can be smoothly supplied between the pair of rollers 30. Note that the gap between the pair of rollers 30 may be widened to be larger than the thickness of the sheet-shaped resin after the secondary forming is finished in each shot, not after the extrusion is started. Next, the piston-cylinder mechanism 96 is driven to thereby move the pair of rollers 30 toward each other and to the closed position, as shown in FIG. 6B. The gap between the pair of rollers 30 is narrowed to sandwich the sheet-shaped resin therebetween, and the sheet-shaped resin is fed downward by the rotation of the rollers.

At this time, while the swollen sheet-shaped resin is fed between the pair of rollers 30 by the rotation thereof, the rotation speed of the rollers is adjusted such that the downward feeding speed of the sheet-shaped resin by the pair of rollers 30 becomes the extrusion speed or more of the thermoplastic resin sheet. More specifically, as the swollen sheet-shaped resin is fed downward between the pair of rollers 30, a length of the sheet-shaped resin drooping in the vertical direction increases. Accordingly, the drooping sheet-shaped resin becomes thinner toward an upper part thereof due to its own weight (draw-down or neck-in). While, the rotation speed of the rollers is adjusted such that the feeding speed by the pair of rollers 30 becomes the extrusion speed or more. Thereby, the sheet-shaped resin is pulled downward by the pair of rollers 30, and is stretched and thinned. In this case, the rotation speed of the rollers is decreased with time, so that the feeding speed is adjusted to be close to the extrusion speed of the thermoplastic resin sheet.

As shown in FIG. 10A, for example, the rotation speed of the rollers may be decreased in a stepwise manner with time while the extrusion speed of the thermoplastic resin sheet is kept constant. Alternatively, as shown in FIG. 10B, the extrusion speed of the thermoplastic resin sheet may be decreased in a stepwise manner with time while the rotation speed of the rollers is kept constant. Further alternatively, as shown in FIG. 10C, both the rotation speed of the rollers and the extrusion speed of the thermoplastic resin sheet may be changed in a stepwise manner with time, in a range where the rotation speed of the rollers is greater than the extrusion speed. In any case, a relative difference in speed between the downward feeding speed of the sheet-shaped resin by the rotation of the pair of rollers 30 and the extrusion speed of the sheet-shaped resin is reduced with time. Consequently, a downward pulling force by the pair of rollers 30 is reduced toward the upper part of the sheet-shaped resin, which relatively reduces the stretching and thinning caused by such a pulling force. Therefore, the thinning caused by the draw-down or neck-in can be canceled, and thus the draw-down or neck-in can be effectively prevented. This makes it possible to provide an even thickness in the extruding direction.

In this case, as a modification, the adjustment of the gap of the extrusion slit 34 may be associated with the adjustment of the rotation speed of the rollers. More specifically, the rotation speed of the rollers may be decreased with time to thereby decrease the downward feeding speed of the sheet-shaped resin by the pair of rollers 30, while the slit gap adjusting device 42 and/or 44 may be used to widen the gap of the extrusion slit 34. Consequently, the thickness of the sheet-shaped resin extruded downward from the extrusion slit 34 is increased with time, in the primary forming. At the same time, the effect of stretching and thinning the sheet-shaped resin by the pair of rollers 30 is lowered. As a result, the sheet-shaped resin becomes thicker toward the upper part thereof, and the effect of stretching and thinning the sheet-shaped resin is lowered. The above synergetic effect makes it possible to more effectively prevent the draw-down or neck-in.

Particularly when the extrusion speed of the sheet-shaped resin is changed during the forming thereof as shown in FIGS. 10B and 10C, it is usually necessary to change the extrusion amount of the molten resin per unit time by the plunger 26. The change in the extrusion amount of the molten resin affects a swelling of the molten resin immediately after extruded from the extrusion slit 34. Therefore, it is preferable to adjust the gap of the extrusion slit 34 at the same time as adjusting the rotation speed of the rollers, for preventing the swelling from thickening the sheet-shaped resin. More specifically, the larger the extrusion amount per unit time, the more shortened the forming time from the start of primary forming to the end of secondary forming. As a result, forming efficiency is improved while shortening a time during which the sheet-shaped resin is drooping before the secondary forming, thereby making it possible to reduce the possibility of draw-down or neck-in. However, the larger the extrusion amount per unit time, the more prominent the swelling becomes in the sheet-shaped resin extruded from the extrusion slit 34. The thickening due to the swelling may make it necessary to adjust the gap between the pair of rollers 30. In this respect, it is a technical advantage to adjust the gap of the extrusion slit 34 to thereby adjust the thickening itself of the sheet-shaped resin caused by the swelling.

In this case, it is possible to adjust the thickness of the sheet-shaped resin to be extruded, only by adjusting the gap of the extrusion slit 34. However, it is technically more advantageous, in the following respects, to adjust the thickness of the sheet-shaped resin by adjusting the rotation speed of the pair of rollers 30.

First, the thickness of the sheet-shaped resin can be adjusted more easily by adjusting the rotation speed of the pair of rollers 30 than by adjusting the gap of the extrusion slit 34. More specifically, when the extrusion amount of the molten resin per unit time is kept constant, the narrower the gap of the extrusion slit 34, the less prominent the swelling becomes in the sheet-shaped resin. However, this increases an extrusion pressure, which accelerates the swelling of the sheet-shaped resin. Therefore, it is difficult to adjust the thickness of the sheet-shaped resin, immediately after extruded from the extrusion slit 34, to a desired value, making it necessary to determine the gap of the extrusion slit 34 on site through trial and error. It is further difficult to adjust the thickness after the swelling by changing the gap of the extrusion slit 34 during the forming.

Second, the adjustment of the rotation speed of the pair of rollers 30 is more responsive to the thickness of the sheet-shaped resin than the adjustment of the gap of the extrusion slit 34. More specifically, when the gap of the extrusion slit 34 is changed, it takes some time for the thickness of the sheet-shaped resin, immediately after extruded from the extrusion slit 34, to reach a stationary state. Therefore, a portion of the sheet-shaped resin just extruded cannot be used for the secondary forming, leading to a decrease in yield. In contrast, in the case of adjusting the rotation speed of the pair of rollers 30, a change in the rotation speed causes a change in the downward feeding speed of the sheet-shaped resin sandwiched between the pair of rollers. Consequently, the pulling force acting on the sheet-shaped resin by the pair of rollers is changed, whereby the sheet-shaped resin is stretched and thinned. Therefore, an excellent responsiveness to the thickness of the sheet-shaped resin can suppress the decrease in yield.

Third, the thickness of the sheet-shaped resin, immediately before clamping in the secondary forming, can be adjusted more easily by adjusting the rotation speed of the pair of rollers 30 than by adjusting the gap of the extrusion slit 34. More specifically, an uneven thickness in the extruding direction of the sheet-shaped resin before clamping, which would be caused by draw-down or neck-in, adversely affects a forming function of blow molding or vacuum forming. In this connection, it is more preferable to secure an even thickness of the sheet-shaped resin immediately before the mold blocks are clamped. In this respect, it is advantageous to adjust the thickness between the primary forming using extrusion and the secondary forming using blow molding or vacuum forming.

Next, as shown in FIG. 8, the sheet-shaped resin having an even thickness in the extruding direction is disposed between the split mold blocks 32 arranged below the pair of rollers 30. Next, as shown in FIG. 9, the split mold blocks 32 are clamped upon complete extrusion of a predetermined amount of the sheet-shaped resin. Then, air between the sheet-shaped resin and the split mold block 32 is pressurized and/or depressurized by being sucked by the vacuum suction chamber 120 through the suction holes 122. In this manner, the sheet-shaped resin is formed in a shape conforming to a shape of the mold. This makes it possible to form a resin molded article having a desired thickness in the extruding direction, without adversely affecting the forming in the secondary forming. Next, as shown in FIG. 11, the split mold blocks 32 are opened to take out the formed resin molded article, and burrs formed around the parting line are removed. As of this moment, the secondary forming is complete. The above steps are repeated each time the molten resin is extruded intermittently in the primary forming. This makes it possible to form sheet-shaped resin molded articles one after another. As described above, it is possible to extrude a thermoplastic resin intermittently as a sheet-shaped molten resin by the primary forming (extrusion molding), and then form the extruded sheet-shaped resin by the secondary forming (blow molding or vacuum forming) using a mold.

A second embodiment of the present invention will be described below with reference to FIGS. 12 to 15. In the explanation below, the same constituent elements as those in the first embodiment are denoted by the same reference numerals and the description thereof will be omitted. Characterizing portions of the present embodiment will be described in detail below. The resin molded article of the first embodiment is a single, solid sheet-shaped molded article, whereas a resin molded article of the present embodiment is a molded article having a hollow portion and formed from two sheet-shaped resins.

In primary forming of the present embodiment, a molten thermoplastic resin is extruded from an extrusion slit 34 of a T-die 28 to droop downward in the shape of a sheet. Then in secondary forming, the sheet-shaped resin extruded downward is used to form a resin molded article by vacuum forming through clamping of split mold blocks 32. These processes are the same as those in the first embodiment. In the present embodiment, two sheet-shaped resins are formed at the same time. That is, as each of the two sheet-shaped resins, the molten thermoplastic resin is extruded from the extrusion slit 34 of the T-die 28 to droop downward in the shape of a sheet. Then in the secondary forming, the two sheet-shaped resins extruded downward are used to form a resin molded article by vacuum forming through clamping of the split mold blocks 32. These processes are different from those in the first embodiment. In the primary forming of each of the two sheet-shaped resins, as in the first embodiment, a relative difference in speed between an extrusion speed of each sheet-shaped resin and a feeding speed of feeding the sheet-shaped resin downward by a pair of rollers 30 is adjusted by adjusting a rotation speed of the pair of rollers 30. Consequently, the sheet-shaped resin is pulled downward by the pair of rollers 30 when passing therebetween, to thereby be stretched and thinned. At the same time, draw-down or neck-in which would be caused by the stretching and thinning is effectively prevented. Note that a gap of the extrusion slit 34 may be adjusted in conjunction with the adjustment of the rotation speed of the pair of rollers 30.

In the secondary forming, first, the two sheet-shaped resins are disposed between split mold blocks 32A and 32B, as shown in FIG. 12. Next, as shown in FIG. 13, mold frames 33A and 33B of the respective split mold blocks 32A and 32B are each moved toward the opposite split mold block and the corresponding one of the two sheet-shaped resins, and then abut against a side surface of the corresponding one of the two sheet-shaped resins. As a result, the respective sheet-shaped resins, and the corresponding mold frames 33 and cavities 116 form a sealed space.

Then, as shown in FIG. 14, air inside the sealed space is sucked by a vacuum suction chamber 120 through suction holes 122. Consequently, each of the two sheet-shaped resins is adsorbed onto the corresponding cavity 116 to thereby be formed in a shape conforming to a surface of the corresponding cavity 116. In this case, the two sheet-shaped resins before the suction each have an even thickness in the vertical direction. This can prevent an unsatisfactory forming step, which would otherwise be performed due to a thickness distribution caused depending on a blow ratio. Next, as shown in FIG. 15, the mold frames 33A and 33B are moved toward each other integrally with the split mold blocks 32A and 32B, respectively, which causes the split mold blocks 32A and 32B to be clamped. Then, pinch-off portions on the respective split mold blocks 32A and 32B weld peripheral portions of the two sheet-shaped resins to each other. As a result, a sealed hollow portion 151 is formed inside the two sheet-shaped resins.

Next, as shown in FIG. 16, the mold frames 33A and 33B are moved away from each other integrally with the split mold blocks 32A and 32B, respectively. The split mold blocks 32A and 32B are opened by this movement, and then a formed resin molded article is taken out and burrs on outer peripheral portions are removed, thereby completing the secondary forming.

It is technically difficult to form a molded article having an even thickness due to a blow ratio when, as is conventionally performed, a cylindrical parison is used to form a resin molded article having a hollow portion. According to the present embodiment, on the other hand, the two sheet-shaped resins each having an even thickness are used and, in the secondary forming, the peripheral portions of the two sheet-shaped resins are welded to each other. This makes it possible to form a molded article having a hollow portion and an even thickness. According to the present embodiment, as described above, the two sheet-shaped resins are used to form a resin molded article having a hollow portion therein. In this case, the thickness of each sheet-shaped resin in the extruding direction is made even prior to the secondary forming, by adjusting the rotation speed of the pair of rollers 30. This prevents an adverse effect on the forming in the secondary forming. Therefore, it is possible to form a sheet-shaped resin having a desired thickness in the secondary forming. The two sheet-shaped resins are used and the peripheral edges thereof are welded to each other by clamping the mold blocks, whereby a resin molded article having a hollow portion therein is formed. Since the peripheral edges of the sheet-shaped resins are securely welded to each other, it is possible to obtain a resin molded article having a sufficient strength despite the hollow portion contained therein.

A third embodiment of the present invention will be described below with reference to FIGS. 17 to 25. In the explanation below, the same constituent elements as those in the second embodiment are denoted by the same reference numerals and the description thereof will be omitted. Characterizing portions of the present embodiment will be described in detail below. The resin molded article of the second embodiment is a molded article having a hollow portion and formed from two sheet-shaped resins, whereas a resin molded article of the present embodiment is a sandwich panel molded article having a reinforcing core material in a hollow portion thereof. In the present embodiment, two sheet-shaped resins are formed in primary forming. At this time, as each of the two sheet-shaped resins, a molten thermoplastic resin is extruded from an extrusion slit 34 of a T-die 28 to droop downward in the shape of a sheet. Then in secondary forming, the two sheet-shaped resins extruded downward are used to form a resin molded article by blow molding or vacuum forming through clamping of split mold blocks 32. These processes are the same as those in the second embodiment. In the secondary forming of the second embodiment, however, a sealed hollow portion is formed inside the two sheet-shaped resins. In the present embodiment, in contrast, such a sealed hollow portion contains a separately formed reinforcing core material. That is, the present embodiment is different from the second embodiment in the forming of a sandwich panel sandwiching the reinforcing core material between the two sheet-shaped resins.

Between split mold blocks 32A and 32B of a sandwich panel forming apparatus, a pair of frame members 128A and 128B is arranged so as to be nested in the split mold blocks 32A and 32B, respectively, while being substantially in parallel to cavities 116. The pair of frame members 128A and 128B has openings 130A and 130B, respectively. A frame member driving device (not shown) moves the pair of frame members 128A and 128B horizontally. In this manner, each of the pair of frame members 128A and 128B is moved toward, and thereby holds, a corresponding sheet-shaped molten resin P. In this state, each of the frame members 128A and 128B can be moved in the opposite direction until a leading end of a pinch-off portion 118 of the corresponding mold block 32A or 32B abuts against a surface of the sheet-shaped resin P through the opening 130.

An example of a material for a reinforcing core material 150 in the present embodiment is a thermoplastic resin, examples of which include acrylic derivatives such as polyolefin (e.g., polypropylene and high-density polyethylene), which is a homopolymer or copolymer of olefins such as ethylene, propylene, butene, isoprene pentene and methylpentene, polyamide, polystyrene, polyvinyl chloride, polyacrylonitrile and ethylene-ethyl acrylate copolymer; vinyl acetate copolymers such as polycarbonate and ethylene-vinyl acetate copolymer; terpolymers such as ionomer and ethylene-propylene-dienes; ABS resin, polyolefin oxide, and polyacetal.

These materials may be used either alone or in combination of two or more. Among the thermoplastic resins, an olefin-based resin or a resin mainly containing the olefin-based resin, and a polypropylene-based resin or a resin mainly containing the polypropylene-based resin are particularly preferable in terms of a good balance among weldability to a fiber layer, mechanical strength and formability. The reinforcing core material 150 may contain an additive, examples of which include inorganic fillers such as silica, mica, talc, calcium carbonate, glass fiber and carbon fiber; a plasticizer, a stabilizer, a colorant, an antistatic agent, a flame retardant, and a foaming agent.

The sheet-shaped resin P constituting a skin material 160 may be the same as that in the first embodiment. Particularly in a sandwich panel, however, the skin material 160 is a strength material. That is, in the sandwich panel, it is preferable to ensure rigidity (particularly, flexural rigidity) of the entire panel by securing a gap between the pair of skin materials 160 disposed on both sides of the reinforcing core material 150 (i.e., bulk (thickness) of the reinforcing core material 150). Therefore, a material for the skin material 160 requires a higher rigidity than at least a material for the reinforcing core material 150.

A decorative material sheet 170 may be disposed on a surface of the skin material 160. The decorative material sheet 170 is constituted for improving an outer appearance, imparting decorativeness, and protecting an object coming into contact with a molded article (e.g., in the case of a cargo floor board, a piece of baggage placed on an upper surface of the board). Examples of a material for the decorative material sheet 170 include a fiber skin material, a sheet-shaped skin material, and a film-shaped skin material. Examples of a material for the fiber skin material include synthetic fibers such as polyester, polypropylene, polyamide, polyurethane, acrylic and vinylon; semi-synthetic fibers such as acetate and rayon; regenerated fibers such as viscous rayon and cuprammonium rayon; natural fibers such as cotton, hemp, wool and silk; and blended fibers thereof.

Among these fibers, in view of feel, durability and molding properties, polypropylene or polyester may be preferable, polyester may be more preferable. Yarns used for the fiber skin may be spurn yarn of staple with a finess of 3 to 15 denier such as polyester with (3 to 5) denier and (50 to 100) mm, and multi-filament of thin flexible filament with about 5 denier and 30 to 200 or a thick mono-filament such as polyester with 400 to 800 denier/lfilament may be combined.

The decorative sheet 170 may be made of unwoven fabric, woven textile, knitted web, raised cloth in which these are raised. In this connection, the woven textile includes a plain weave fabric in which warps and wefts are upwardly and downwardly interwoven in an alternate manner, and various change weave in which yarns are interwoven with several yarns being passed over. Among these, the unwoven fabric may be preferable, since it can be readily formed into a three dimensional shape due to the fact that it has no directional property related to an extension, and its surface has good feel and suitability. In this case, the unwoven fabric is defined to be a textile product which is made by laminating fibers in parallel or in a crossing manner, or randomly distributing fibers to form webs, and then, joining formed webs. In view of a reproducibility of three dimensional shape and the external appearance of the formed product, the unwoven fabric manufactured by a needle-punch method may be preferable. In addition, since the unwoven fabric manufactured by the needle-punch method has a strength smaller than the woven fabric and an extensibility larger than the woven fabric, so that it tends to be easily deformed in any direction, it may be preferable that binder be attached to the fabric, or that the web and the unwoven fabric be punched together by lap needles in order to improve the strength of the unwoven fabric and to stabilize its size. In view of the above, the decorative sheet 170 may be preferably made of polypropylene or polyester. In this case, since the decorative sheet 170 is thermally plastic, it can be used for another application by removing and recovering it and heating it to deform. For instance, a recycle process can be readily carried out by the fact that a main resin layer is made of polypropylene, while the decorative sheet 170 is made of polypropylene unwoven fabric same as the main resin layer.

On the other hand, if the decorative sheet 170 is made of polyester unwoven fabric, since the melt point of the main resin layer made of polypropylene is different from that of the fiber skin, troubles that change of properties of the formed product is caused, or that the formed product can be deformed, or that the decoration 14 cannot be precisely adhered to the formed product, due to the heat, can be restricted in a case where the formed product is adhered to the decorative sheet 170. In addition, the molding properties, the stiffness, the external appearance, and the durability of the formed product is maintained. Further, the tensile strength of the decorative sheet 170 may be preferably higher than, or equal to 15 kg/cm$^2$ and the extensibility thereof may be preferably higher than, or equal to 30%, in view of the reproducibility of three dimensional shape and the molding properties. In this connection, such a tensile strength and extensibility are measured at a temperature of 20° C. pursuant to JIS-K-7113. A thermoplastic elastomer, embossed resin layers, resin layers an outer surface of which a printed layer is attached to, synthetic leather, meshed skin layers with slip resistance, etc. may be used for the sheet-like skin and the film-like skin.

A method for forming such a sandwich panel 10 will be described below. First, as shown in FIG. 18, the sheet-shaped decorative material sheet 170 is inserted between one of the split mold blocks 32 and one of the frame members 128, from the side of the two split mold blocks 32. The sheet-shaped decorative material sheet 170 is temporarily fixed to one of the split mold blocks 32 so as to cover the cavity 116, with temporary fixing pins (not shown) provided on the corresponding split mold block 32.

Next, as shown in FIG. 19, the two sheet-shaped molten resins P made of a thermoplastic resin are respectively extruded from the extrusion slits 34 vertically downward. At this time, as in the first and second embodiments, a rotation speed of a pair of rollers 30 is adjusted in a range where a downward feeding speed of the sheet-shaped resin P made of a thermoplastic resin, sandwiched between the pair of rollers 30 and fed by the rotation thereof, is an extrusion speed or more. In this manner, the sheet-shaped resin P made of a thermoplastic resin is stretched and thinned due to the rotation of the pair of rollers 30, while preventing draw-down or neck-in which would otherwise be caused by the stretching and thinning. This makes it possible to form the sheet-shaped resin P made of a thermoplastic resin and having an even thickness in the extruding direction, before clamping in the secondary forming.

Note that a gap of the extrusion slit 34 may be adjusted in conjunction with the adjustment of the rotation speed of the pair of rollers 30.

Next, the two continuous sheet-shaped resins P are supplied between the two split mold blocks 32. At the same time, the pair of frame members 128 is moved toward the corresponding continuous sheet-shaped resins P by the frame member driving device. Then, as shown in FIG. 20, the frame members 128 each holding the continuous sheet-shaped resin P are moved toward the corresponding split mold blocks 32. By this movement, the pinch-off portion 118 of each mold block 32 abuts against the surface of the continuous sheet-shaped resin P facing the cavity 116, through the opening 130 of the frame member 128. As a result, the surface of the continuous sheet-shaped resin P facing the cavity 116, the pinch-off portion 118, and the cavity 116 form a sealed space.

Next, as shown in FIG. 21, each split mold block 32 sucks the corresponding sealed space. Consequently, the corresponding continuous sheet-shaped resin P is pressed against the cavity 116, to thereby be formed in a shape conforming to the cavity 116. Note that the continuous sheet-shaped resin P on the left side of FIG. 21 is welded to the decorative material sheet 170 interposed between the continuous sheet-shaped resin P and the cavity 116, at the time of being formed.

Next, as shown in FIG. 22, the reinforcing core material 150, which is held by suction pads 119 of a manipulator (not shown), is inserted between the two split mold blocks 32 from the side thereof.

Next, as shown in FIG. 23, the manipulator is moved horizontally toward the split mold block 32 on the right. In this manner, the reinforcing core material 150 is pressed against, and thereby welded to, the continuous sheet-shaped resin P adsorbed onto the cavity 116 of the split mold block 32 on the right. Then, the suction pads 119 are separated from the reinforcing core material 150 to draw the manipulator from between the two split mold blocks 32, in preparation for clamping. Next, as shown in FIG. 24, the two split mold blocks 32 are moved from an opened position toward each other to a closed position by a mold driving device, to thereby be clamped. Consequently, the reinforcing core material 150 welded to one of the continuous sheet-shaped resins P (on the right in FIG. 24) is welded to the other sheet-shaped resin P. As the same time, a parting line PL is formed upon welding of peripheral edges of the continuous sheet-shaped resins P. Note that, at the time of clamping, the reinforcing core material 150 itself is formed in advance, unlike the skin material sheet 160, before being welded to the molten skin material sheet 160. Therefore, the reinforcing core material 150 itself is positioned in advance so as not to be deformed by the clamping.

Through the above steps, the sandwich panel 10 obtained by laminating the decorative material sheet 170, the skin material sheet 160, the reinforcing core material 150 and the skin material sheet 160, is completed. Next, as shown in FIG. 25, the two split mold blocks 32 are opened to separate the cavities 116 from the finished sandwich panel 10, and burrs formed around the parting line PL are removed. At this point, the forming of the sandwich panel is completed. In the present embodiment, the thickness of each sheet-shaped resin in the extruding direction is made even prior to the secondary forming, by adjusting the rotation speed of the pair of rollers 30. This prevents an adverse effect on the forming in the secondary forming. Therefore, it is possible to form a sheet-shaped resin having a desired thickness in the secondary forming. The above-described two sheet-shaped resins are used as skin materials to weld the peripheral edges thereof to each other by clamping, thereby forming the sandwich panel containing the reinforcing core material therein. Since the peripheral edges of the sheet-shaped resins serving as the skin materials are securely welded to each other, it is possible to obtain a sandwich panel which is required to have a sufficient strength, particularly flexural rigidity, such as a cargo floor board for a vehicle, for example.

The embodiments of the present invention have been described above in detail, but those skilled in the art can conceive of various alterations and modifications without departing from the spirit and scope of the invention. In the first embodiment, for example, the resin molded article has an even thickness in order to prevent draw-down or neck-in. However, the present invention is not limited to this example, and the rotation speed of the pair of rollers may be more actively adjusted such that the resin molded article has a desired thickness distribution in the extruding direction, before clamping in the secondary forming. In the forming of the resin molded article having a hollow portion in the second embodiment, the two sheet-shaped resins of the same type and color are used. However, the present invention is not limited to this example, and two sheet-shaped resins of different types or colors may be respectively used as a rear surface and a front surface for a casing of, for example, a game machine. In the third embodiment, the decorative material sheet is disposed between the split mold blocks and welded to the skin material sheet upon clamping of the split mold blocks. However, the present invention is not limited to this example, and a decorative material sheet may be supplied between the pair of rollers together with the sheet-shaped resins serving as the skin material sheets. Then, the decorative material sheet may be pressure-bonded to the sheet-shaped resin while the thickness of the sheet-shaped resin is adjusted by adjusting the rotation speed of the pair of rollers.

BRIEF EXPLANATION OF DRAWINGS

The foregoing and other objects, features, aspects and advantages of the invention will become more apparent from the following detailed description when taken in conjunction with the accompanying drawings.

Figure 1:
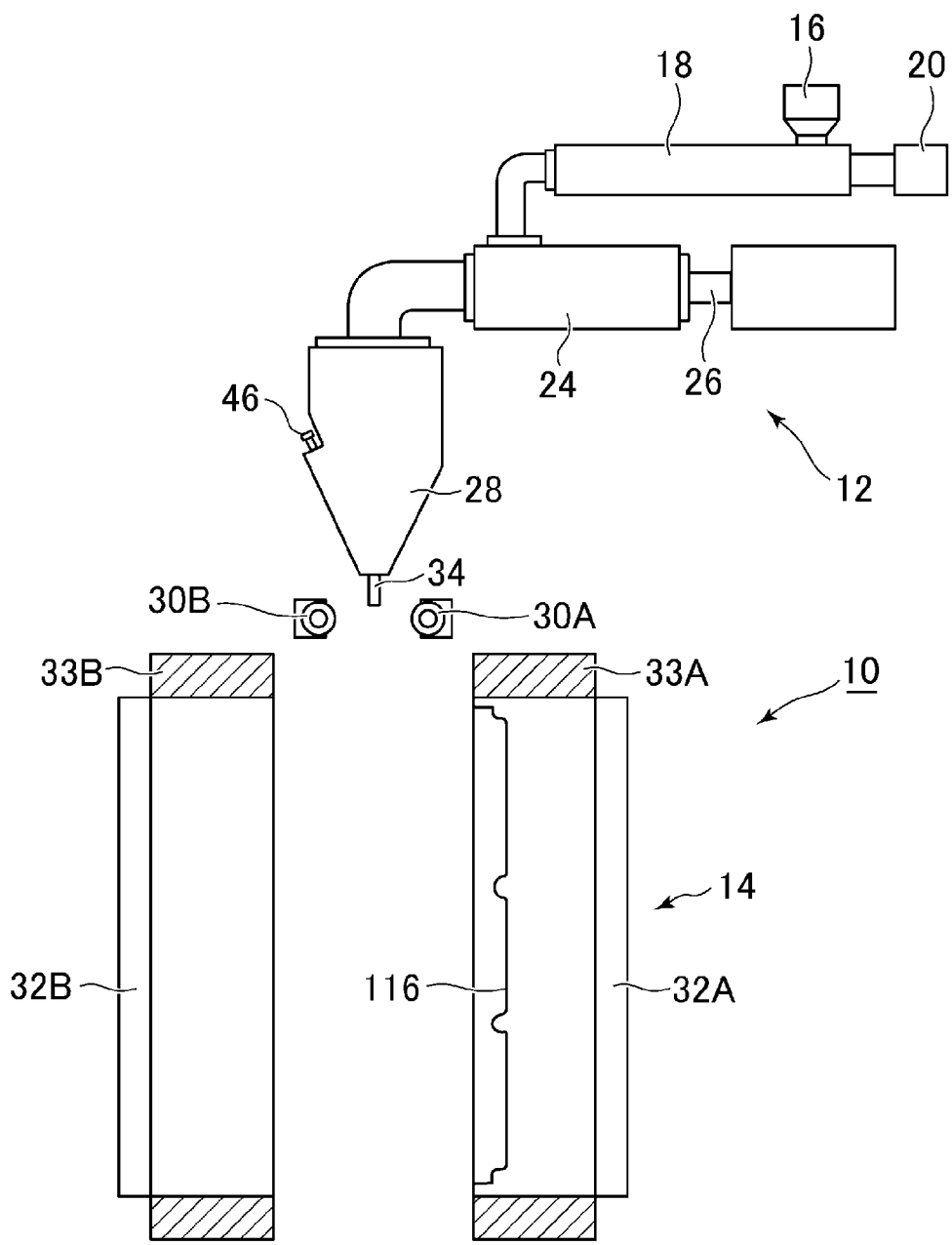
FIG. 1 is a schematic side view illustrating a resin molded article forming apparatus according to a first embodiment of the present invention.
Figure 2:
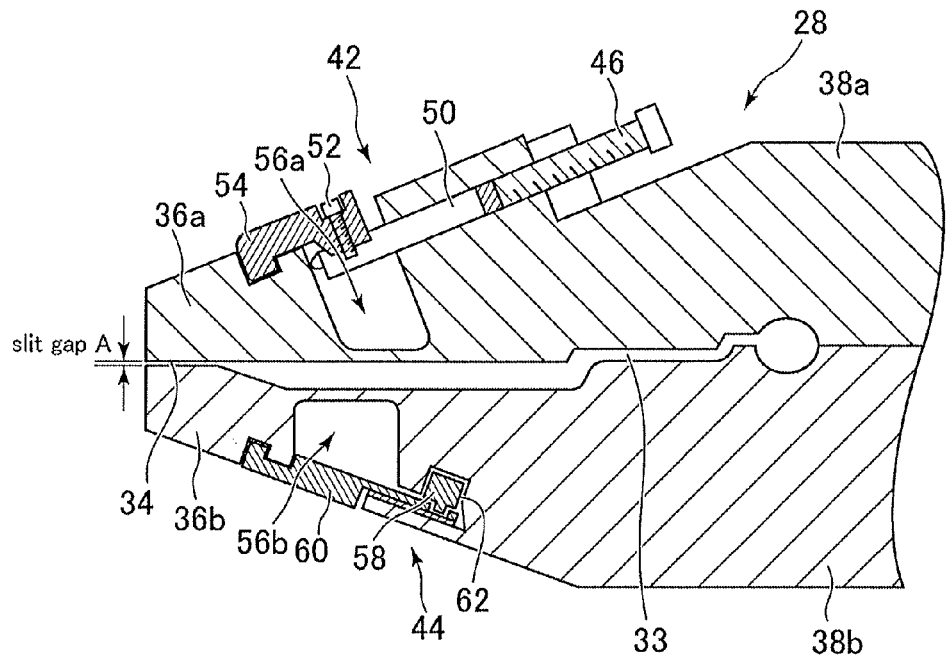
FIG. 2 is a schematic sectional view illustrating the details of a periphery of an extrusion slit in a T-die of the resin molded article forming apparatus according to the first embodiment of the present invention.
Figure 3:
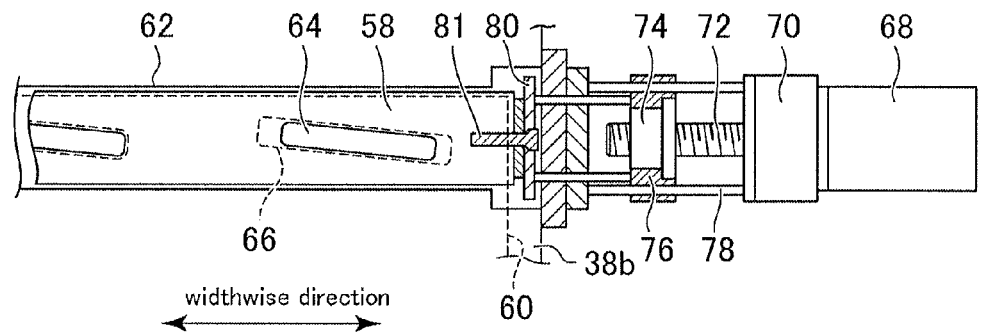
FIG. 3 is a view illustrating the details of an extrusion slit driving device in the T-die of the resin molded article forming apparatus according to the first embodiment of the present invention.
Figure 4:
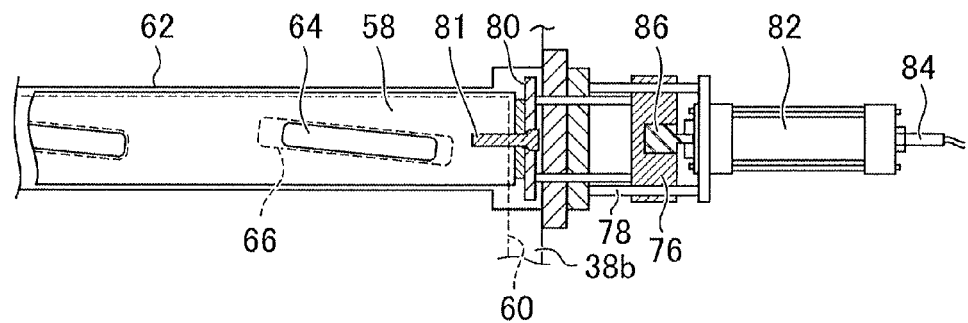
FIG. 4 is a view similar to FIG. 3 and illustrating the details of a modification of the extrusion slit driving device in the T-die of the resin molded article forming apparatus according to the first embodiment of the present invention.
Figure 5:
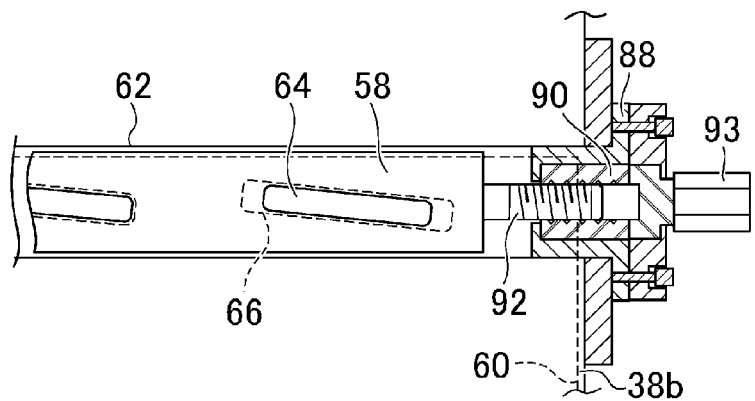
FIG. 5 is a view similar to FIG. 3 and illustrating the details of another modification of the extrusion slit driving device in the T-die of the resin molded article forming apparatus according to the first embodiment of the present invention.
Figure 6:
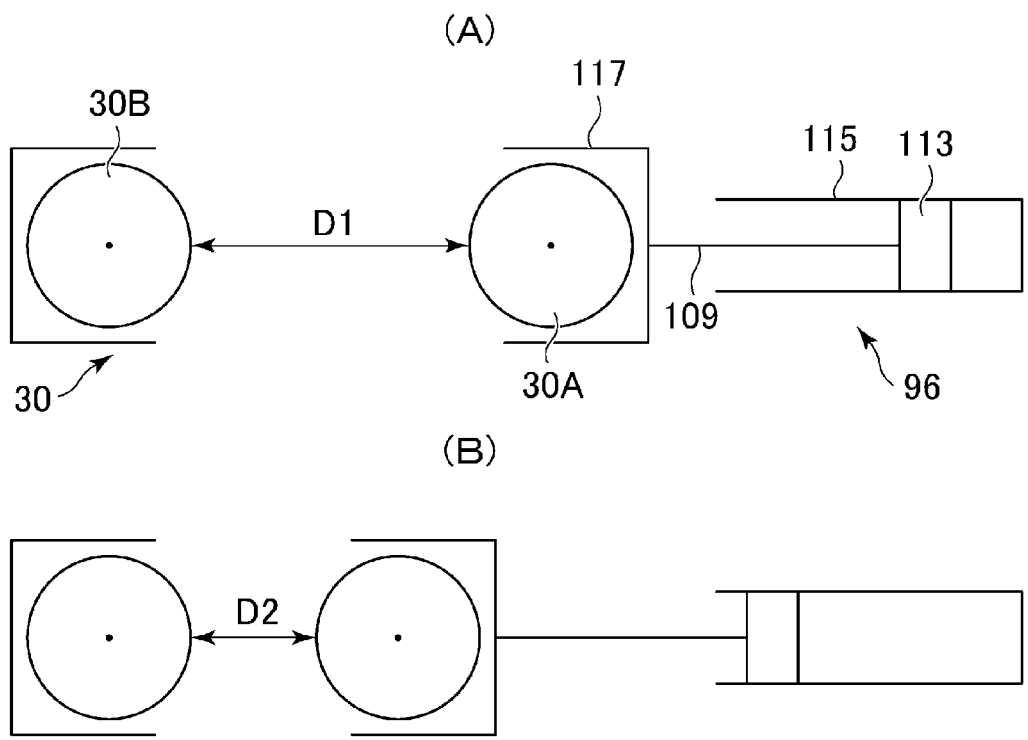
FIGS. 6A and 6B are schematic side views each illustrating a periphery of a pair of rollers of the resin molded article forming apparatus according to the first embodiment of the present invention.
Figure 7:
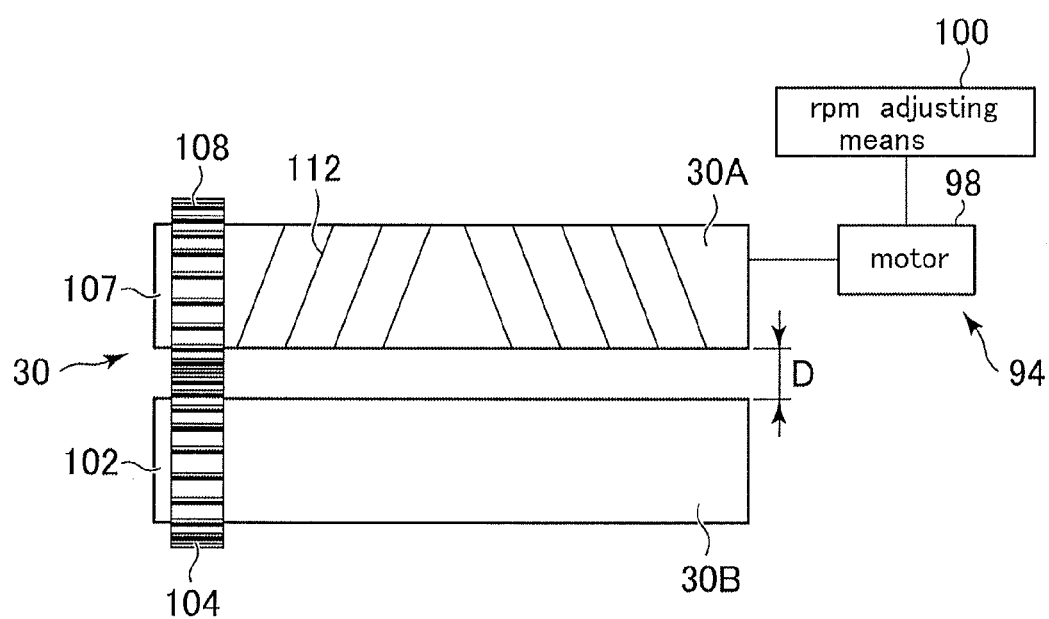
FIG. 7 is a schematic plan view illustrating the periphery of the pair of rollers of the resin molded article forming apparatus according to the first embodiment of the present invention.
Figure 8:
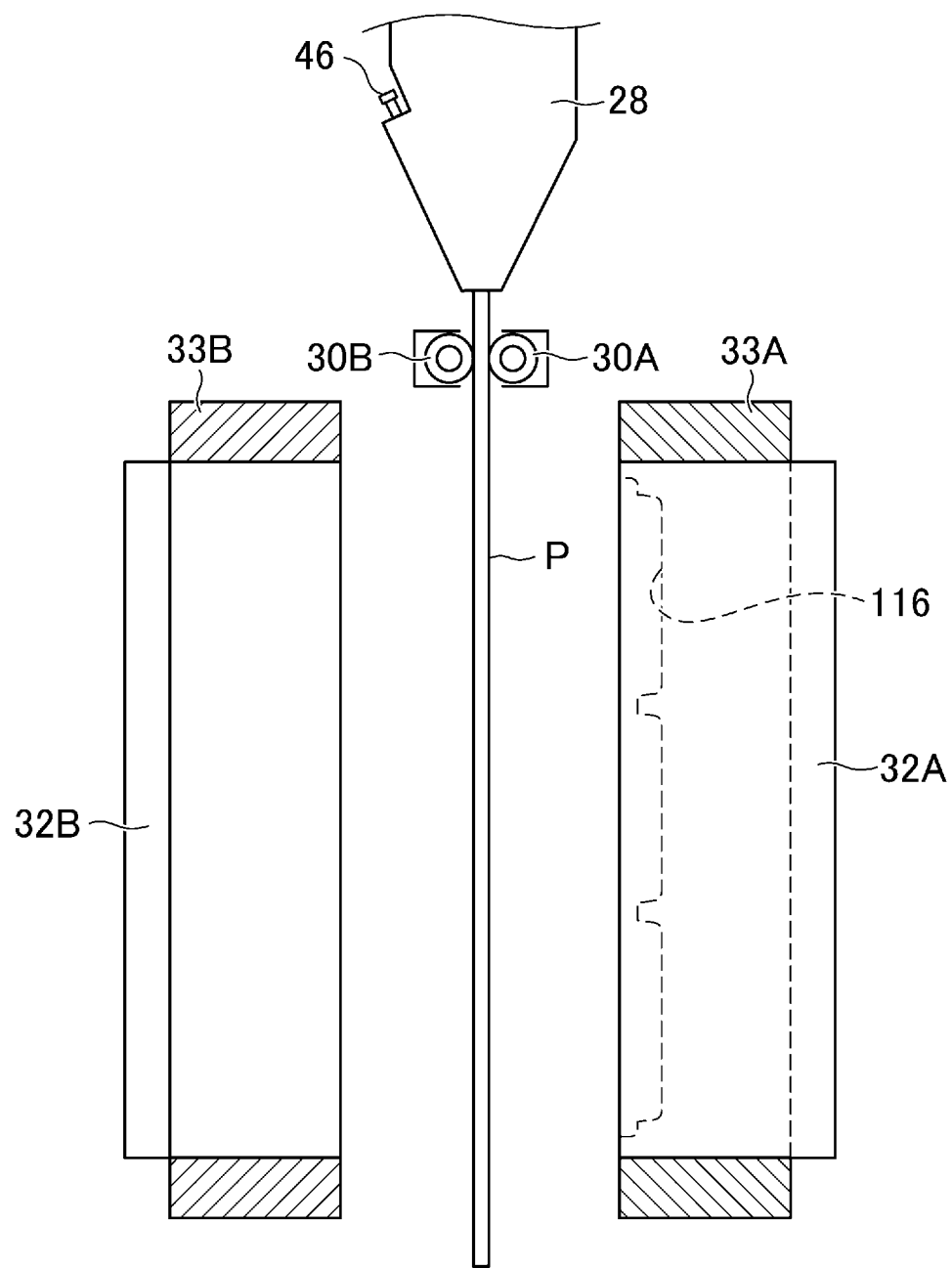
FIG. 8 is a schematic side view illustrating a sheet-shaped resin disposed between split mold blocks in the resin molded article forming apparatus according to the first embodiment of the present invention.
Figure 9:
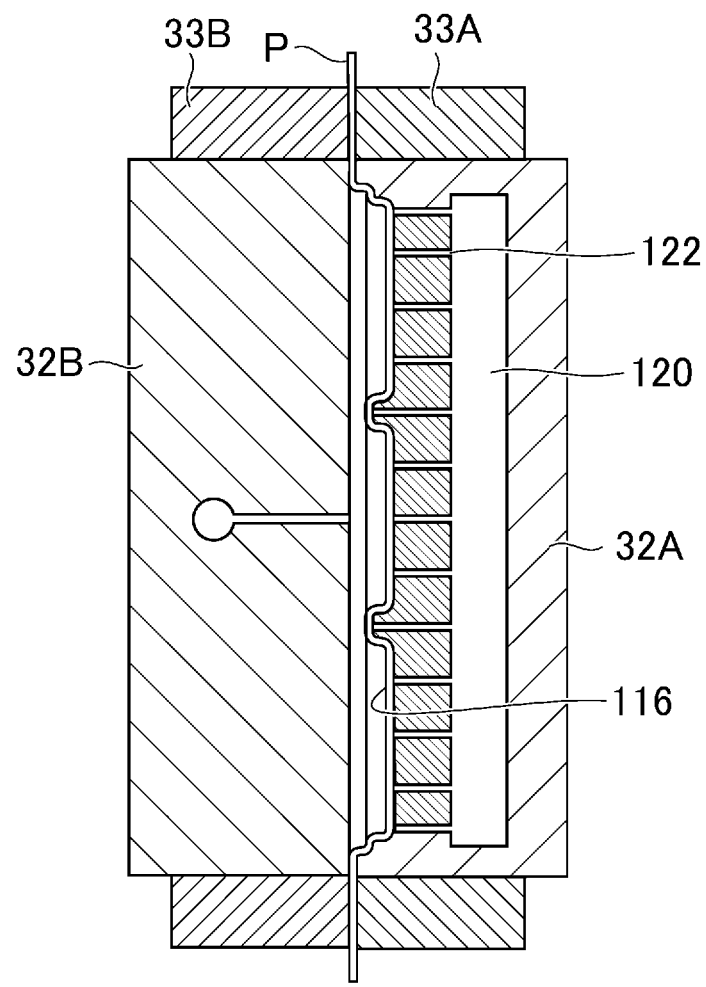
FIG. 9 is a schematic side view illustrating the split mold blocks that have been clamped, in the resin molded article forming apparatus according to the first embodiment of the present invention.
Figure 10:
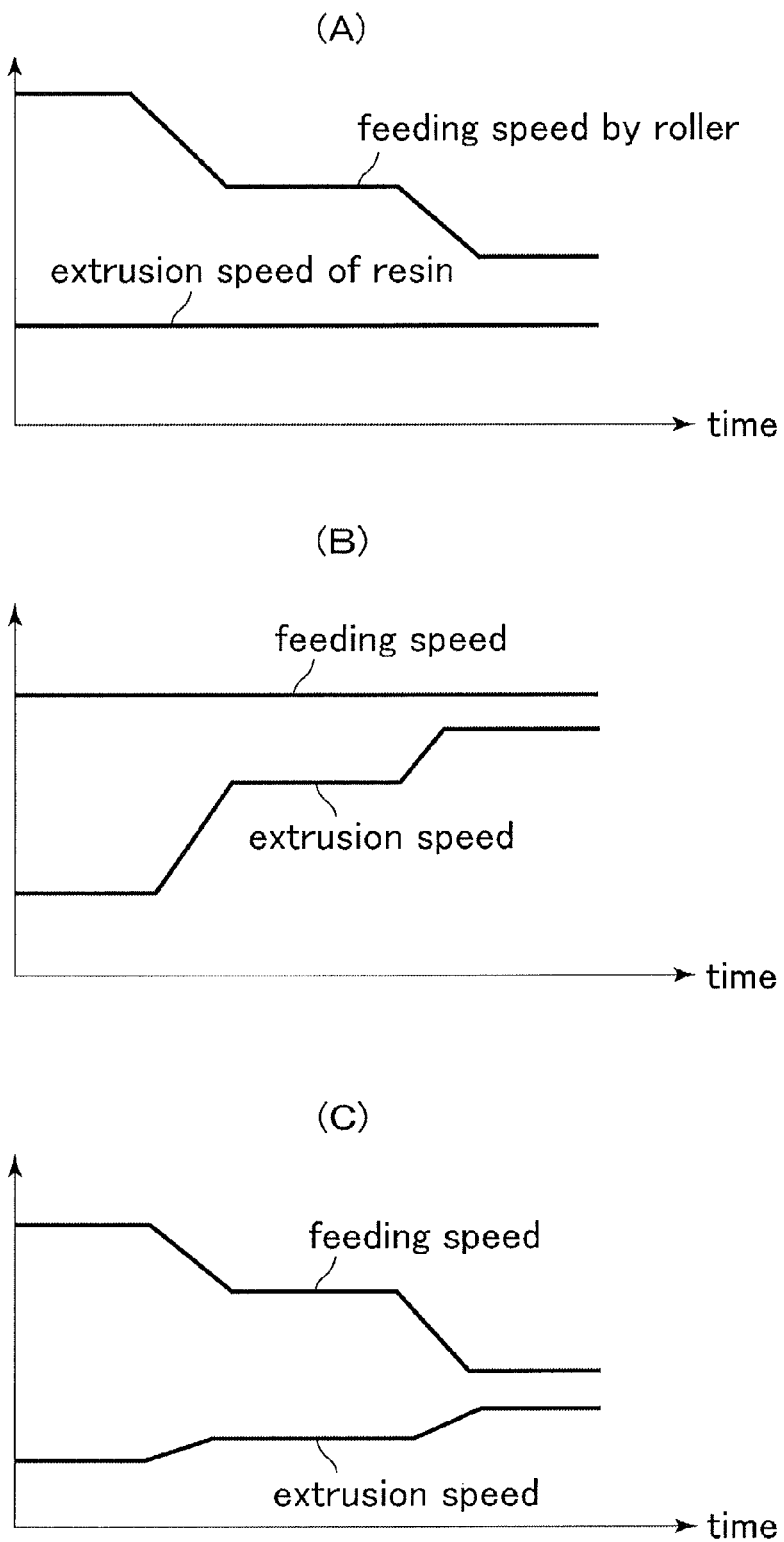
FIGS. 10A, 10B and 10C are simplified graphs each showing temporal change in an extrusion speed of the sheet-shaped resin and a rotation speed of the rollers, in the resin molded article forming apparatus according to the first embodiment of the present invention.
Figure 11:
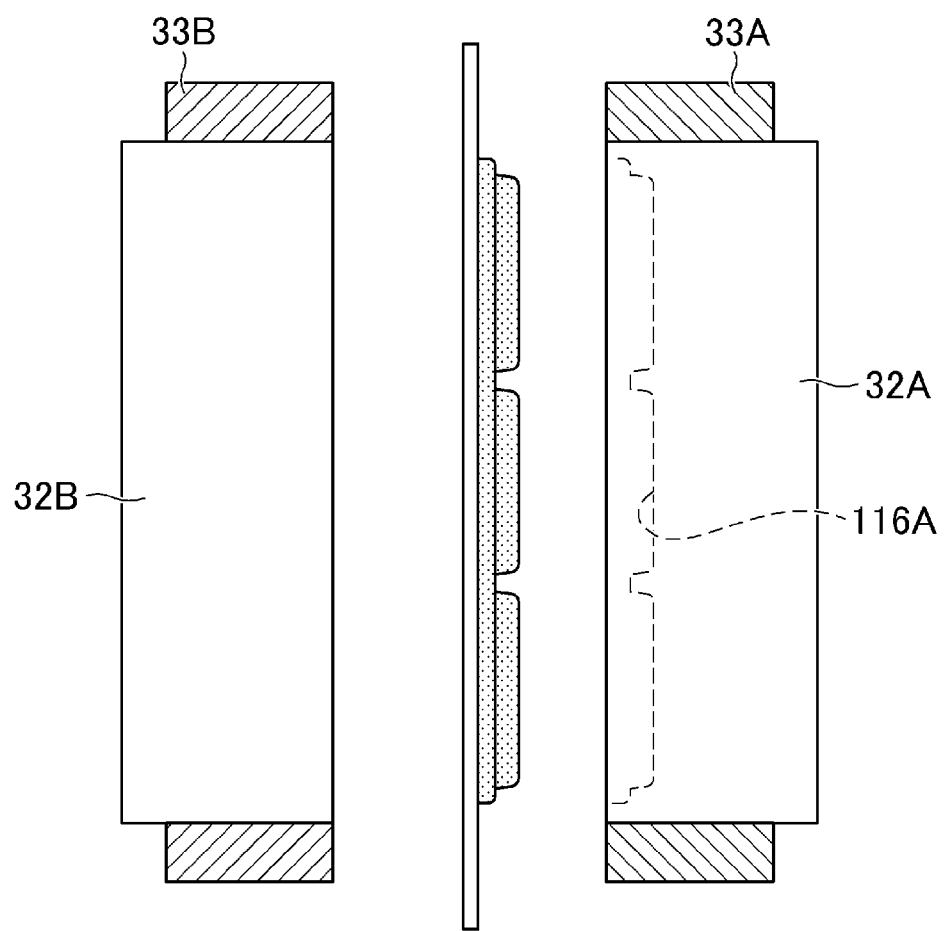
FIG. 11 is a schematic side view illustrating the split mold blocks that have been opened, in the resin molded article forming apparatus according to the first embodiment of the present invention.
Figure 12:
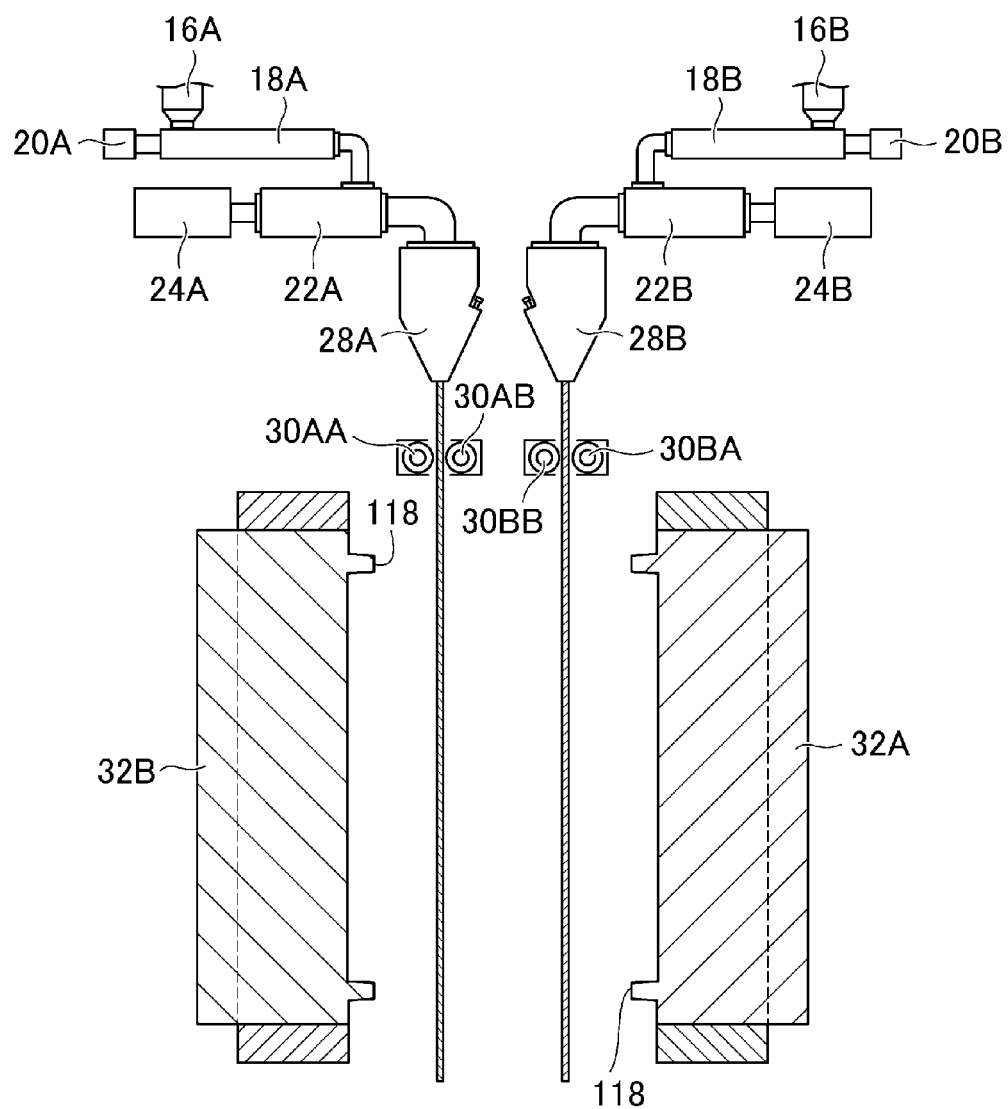
FIG. 12 is a view similar to FIG. 1 and illustrating a resin molded article forming apparatus according to a second embodiment of the present invention.
Figure 13:
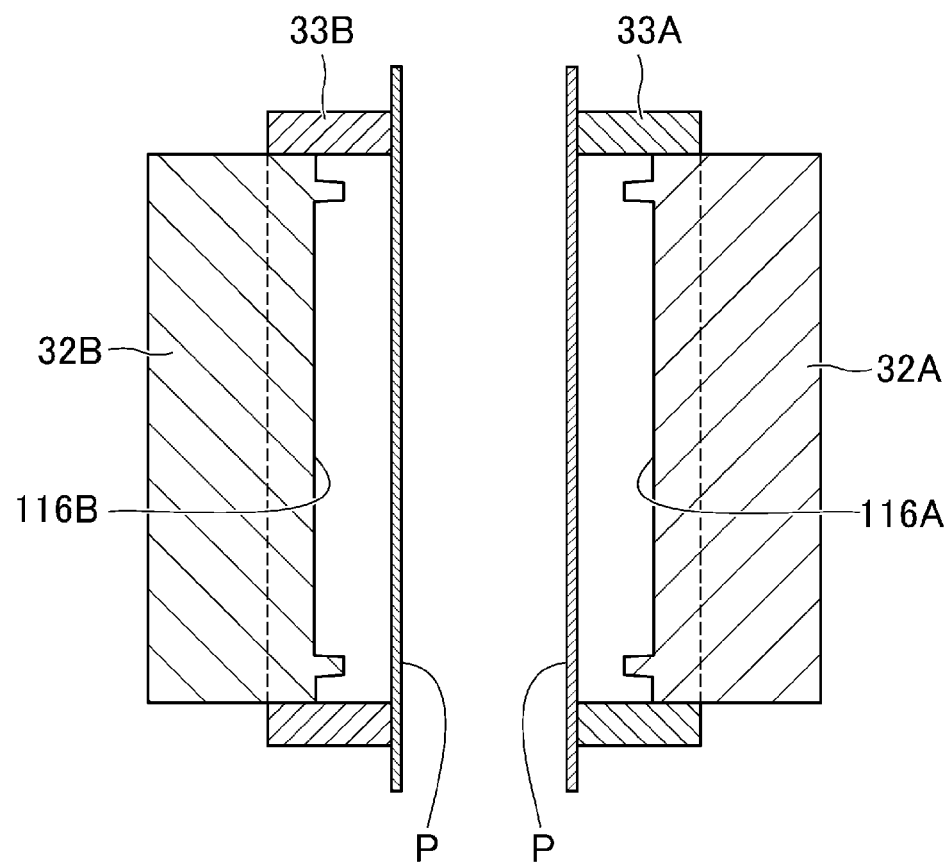
FIG. 13 is a schematic side view illustrating two sheet-shaped resins that have been sucked by split mold blocks, in the resin molded article forming apparatus according to the second embodiment of the present invention.
Figure 14:
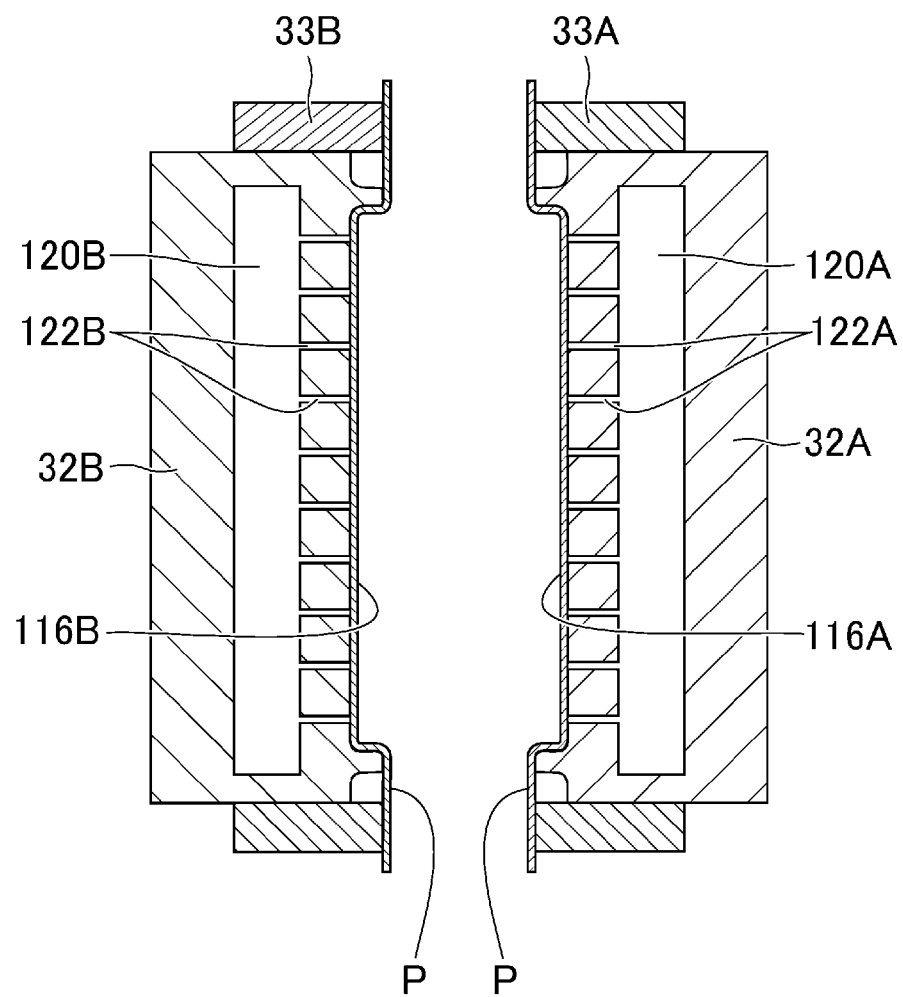
FIG. 14 is a schematic side view illustrating the two sheet-shaped resins that have been subjected to vacuum forming by the split mold blocks, respectively, in the resin molded article forming apparatus according to the second embodiment of the present invention.
Figure 15:
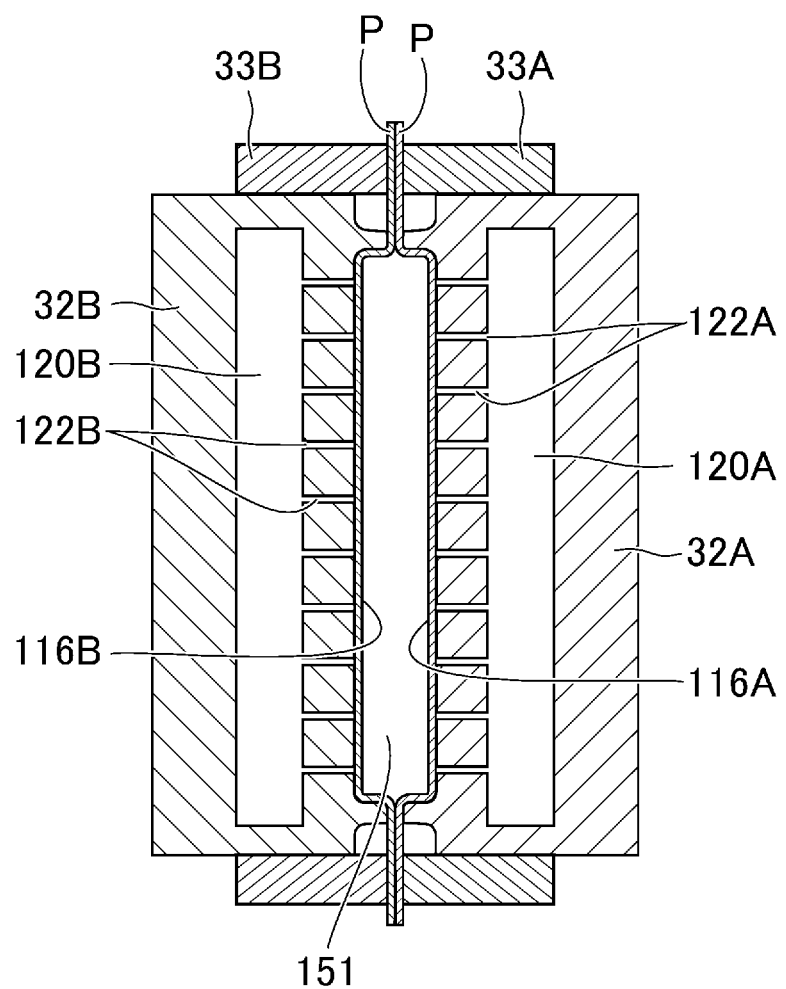
FIG. 15 is a schematic side view illustrating the split mold blocks that have been clamped, in the resin molded article forming apparatus according to the second embodiment of the present invention.
Figure 16:
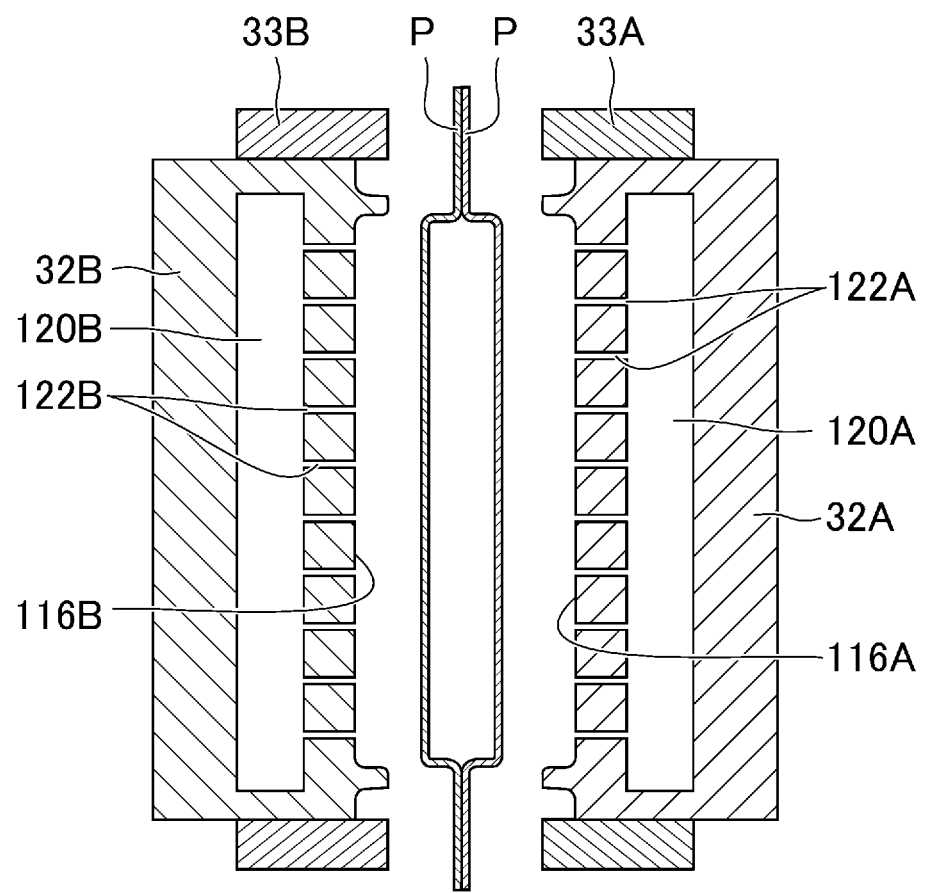
FIG. 16 is a schematic side view illustrating the split mold blocks that have been opened, in the resin molded article forming apparatus according to the second embodiment of the present invention.
Figure 17:
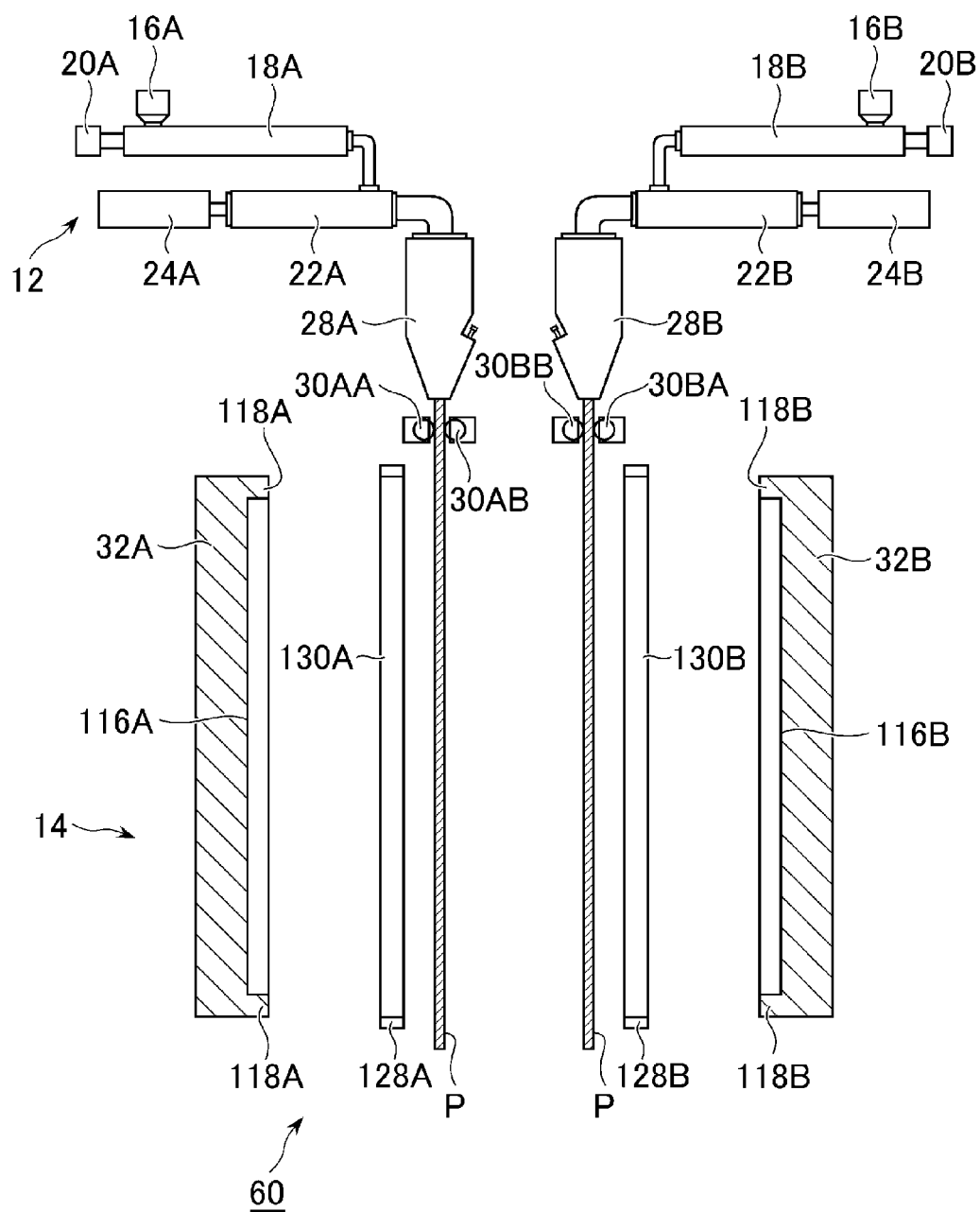
FIG. 17 is a view schematically illustrating a sandwich panel forming apparatus according to a third embodiment of the present invention.
Figure 18:
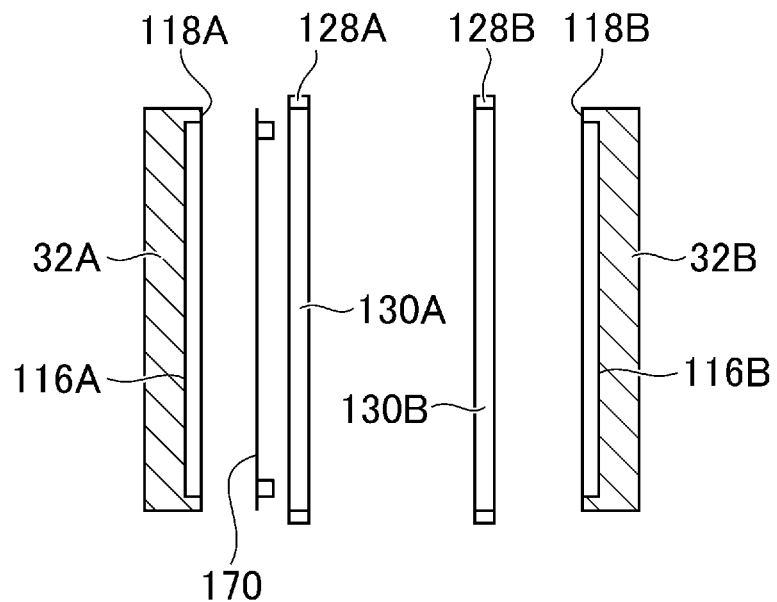
FIG. 18 is a view illustrating a decorative material sheet disposed between split mold blocks in a sandwich panel forming step according to the third embodiment of the present invention.
Figure 19:
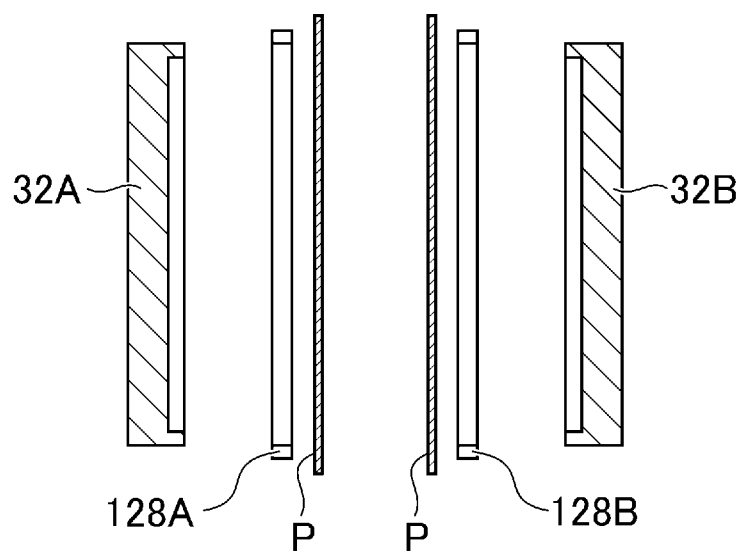
FIG. 19 is view illustrating skin material sheets disposed between the split mold blocks in a sandwich panel forming step according to the third embodiment of the present invention.
Figure 20:
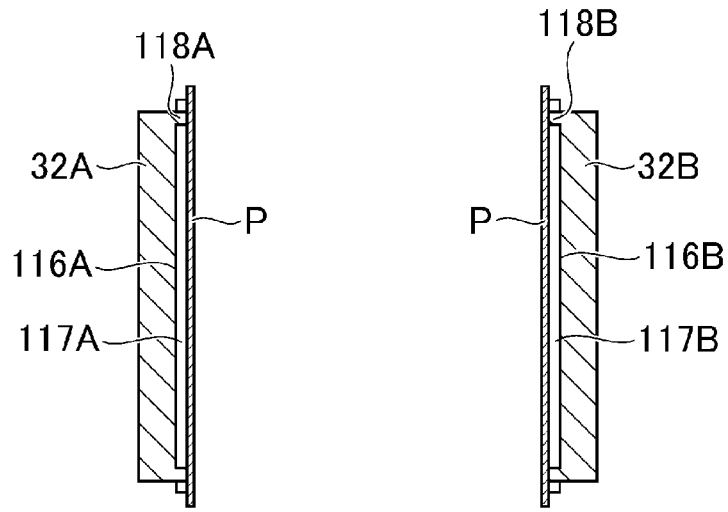
FIG. 20 is a view illustrating the skin material sheets abutting against the split mold blocks in a sandwich panel forming step according to the third embodiment of the present invention.
Figure 21:
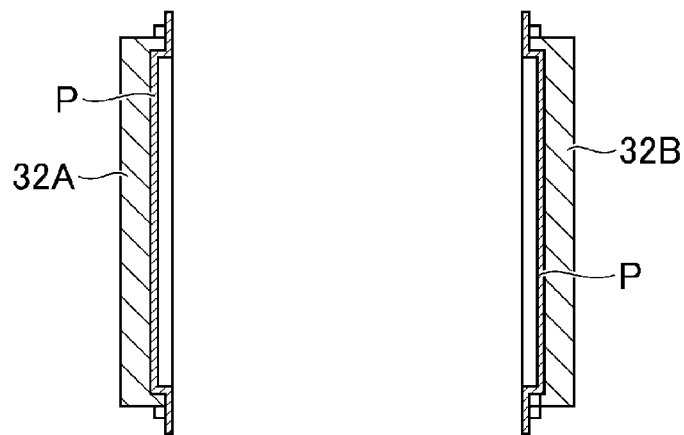
FIG. 21 is a view illustrating the skin material sheets that have been formed, in a sandwich panel forming step according to the third embodiment of the present invention.
Figure 22:
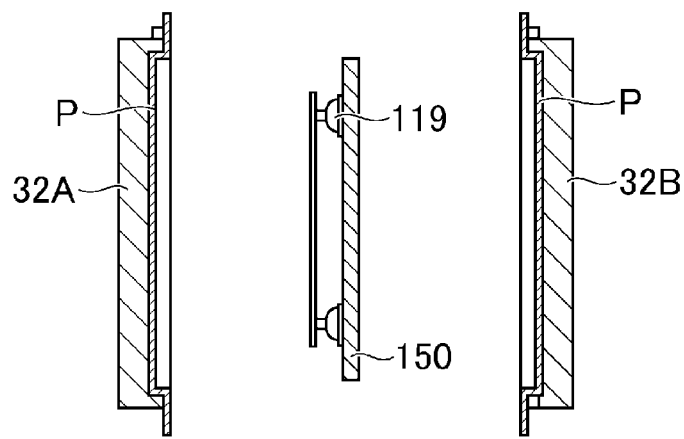
FIG. 22 is a view illustrating a core material sheet disposed between the split mold blocks in a sandwich panel forming step according to the third embodiment of the present invention.
Figure 23:
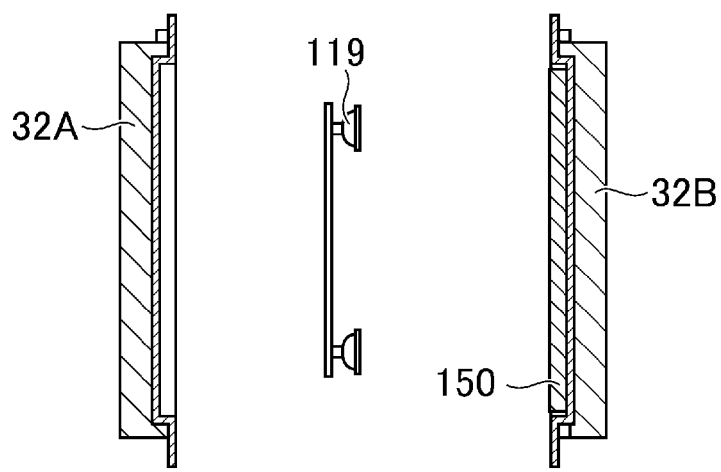
FIG. 23 is a view illustrating the core material sheet pressed against one of the skin material sheets in a sandwich panel forming step according to the third embodiment of the present invention.
Figure 24:
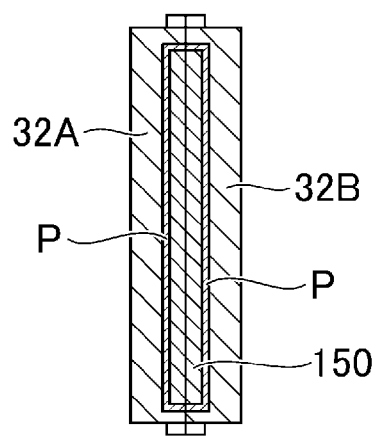
FIG. 24 is a view illustrating the split mold blocks that have been clamped, in a sandwich panel forming step according to the third embodiment of the present invention.
Figure 25:
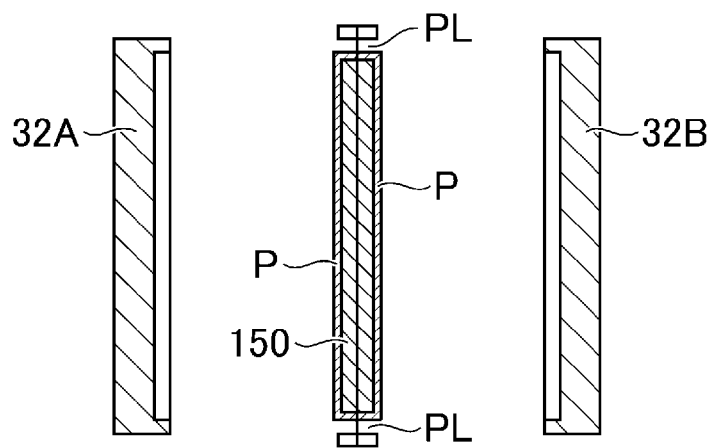
FIG. 25 is a view illustrating the split mold blocks that have been opened, in a sandwich panel forming step according to the third embodiment of the present invention.

What is claimed is:

1. A method for forming a resin molded article, characterized by comprising the steps of:
   melting and kneading a thermoplastic resin;
   storing a predetermined amount of the melted and kneaded thermoplastic resin;
   extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed;
   sandwiching the sheet-shaped resin between a pair of rollers arranged below the extrusion slit in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin;
   feeding the resin downward at a feeding speed higher than, or equal to the predetermined extrusion speed by rotary driving of the rollers, so as to make the thickness of the molten sheet-shaped resin uniform in the extruding direction;
   disposing the sheet-shaped molten resin, fed by the rollers, near a side of a mold arranged below the pair of rollers; and
   forming the sheet-shaped resin in a shape conforming to a shape of the mold at least by depressurizing a sealed space formed between the sheet-shaped resin and the mold.

2. The method for forming a resin molded article according to claim 1, wherein said feeding step by the rollers comprises a step of varying the rotation speed of said rollers so as to set the feeding speed of said pair of rollers higher than, or equal to the predetermined extrusion speed of the sheet-shaped resin, in accordance with the predetermined extrusion speed, whereby the thickness of the sheet-shaped resin having passed through said pair of rollers is stretched and thinned so as to become thinner than, or equal to that of the sheet-shaped resin upon being extruded from the extrusion slit, in order for the thickness of the molten sheet-shaped resin disposed to be near the side of the mold to be formed to be substantially uniform in an extruding direction.

3. The method for forming a resin molded article according to claim 1, wherein said feeding step by the rollers comprises a step of adjusting a force pressing the sheet-shaped resin against the pair of rollers so as not to generate a slip between the surface of the pair of rollers and the sheet-shaped resin.

4. The method for forming a resin molded article according to claim 1, wherein said extruding step comprises a step of adjusting the thickness of the molten sheet-shaped resin by regulating a slit gap of the extruding die.

5. The method for forming a resin molded article according to claim 1, wherein the extrusion speed is kept constant in said extruding step, and the rotating speed of the rollers is variable in said feeding step by the rollers.

6. The method for forming a resin molded article according to claim 5, wherein said feeding step by the rollers comprises a step of decreasing the rotation speed of the rollers monotonously.

7. The method for forming a resin molded article according to claim 4, wherein the extrusion speed is variable, and the slit gap of the extrusion die is adjusted in accordance with the extrusion speed in said extruding step, and the rotation speed of the rollers is kept constant in said feeding step by the rollers.

8. The method for forming a resin molded article according to claim 4, wherein the extrusion speed is variable, and the slit gap of the extrusion die is adjusted in accordance with the extrusion speed in said extruding step, and the rotation speed of the rollers is variable in said feeding step by the rollers.

9. The method for forming a resin molded article according any of claim 1, wherein said feeding step by the rollers comprises a step of adjusting the rotation speed of the rollers, in accordance with the distribution of the thickness of the sheet-shaped resin in a feeding direction which is required in said forming step.

10. The method for forming a resin molded article according to claim 1, wherein said feeding step by the rollers comprises a step of adjusting the rotation speed of the rollers, in accordance with MFR value of the thermoplastic resin.

11. The method for forming a resin molded article according to claim 4, wherein said step of adjusting the slit gap of the extrusion die in said extruding step and said step of adjusting the rotation speed of the rollers in said feeding step by the rollers are linked to each other.

12. A method for forming a resin molded article, characterized by comprising the steps of:
melting and kneading a first thermoplastic resin;
storing a predetermined amount of the melted and kneaded first thermoplastic resin;
extruding the stored first thermoplastic resin intermittently from a first T-die to droop downward in a shape of a molten sheet; and
sandwiching the first sheet-shaped resin, extruded downward, between a first pair of rollers arranged below the first T-die and feeding the first sheet-shaped resin downward by rotary driving of the rollers;
said feeding step comprising a step of adjusting the rotation speed of the rollers so as to set the feeding speed to be higher than, or equal to the extrusion speed of the first sheet-shaped resin, in accordance with the extrusion speed, so as to make the thickness of the second molten sheet-shaped resin uniform in the extruding direction,
the method further comprising the steps of:
melting and kneading a second thermoplastic resin;
storing a predetermined amount of the melted and kneaded second thermoplastic resin;
extruding the stored second thermoplastic resin intermittently from a second T-die to droop downward in a shape of a molten sheet; and
sandwiching the second sheet-shaped resin, extruded downward, between a second pair of rollers arranged below the second T-die and feeding the second sheet-shaped resin downward by rotary driving of the rollers;
said feeding step comprising a step of adjusting the rotation speed of the rollers so as to set the feeding speed to be higher than, or equal to the extrusion speed of the second sheet-shaped resin, in accordance with the extrusion speed, so as to make the thickness of the second molten sheet-shaped resin uniform in the extruding direction,
the method further comprising the steps of:
disposing the first and second sheet-shaped molten resins, fed by the first and second pairs of rollers, respectively, between split mold blocks arranged below the first and second pairs of rollers, and depressurizing air between one of the split mold blocks and the first sheet-shaped resin to cause the first sheet-shaped resin to closely adhere to a cavity of the one of the split mold blocks, while depressurizing air between the other of the split mold blocks and the second sheet-shaped resin to cause the second sheet-shaped resin to closely adhere to a cavity of the other of the split mold blocks, after which the split mold blocks are clamped, wherein,
upon the clamping of the split mold blocks, the first and second sheet-shaped resins are integrally welded to each other by pinch-off forming portions on outer peripheries of the mold blocks to form a resin molded article having a sealed hollow portion.

13. The method for forming a resin molded article according to claim 12, further comprising a step of positioning a core member between the first sheet-shaped resin fed downwardly and the second sheet-shaped resin fed downwardly, and a step of clamping the first sheet-shaped resin fed downwardly, the second sheet-shaped resin fed downwardly and the positioned core member in a direction substantially perpendicular to the direction in which the resins are fed and disposing the core member within the sealed hollow portion with the core member being sandwiched between said first and second sheet-shaped resins.

14. The method for forming a resin molded article according to claim 12, wherein said first sheet-shaped resin feeding step and said second sheet-shaped resin feeding step are carried out concurrently.

15. The method for forming a resin molded article according to claim 12, wherein said disposing step comprises a step of pressing the core member against either of the first or second molten thermoplastic sheet-shaped resin.

16. The method for forming a resin molded article according to claim 15, wherein said pressing step comprises a step of welding the core member to either of said first or second sheet-shaped resin.

17. The method for forming a resin molded article according to claim 12, wherein said feeding step by the rollers comprises a step of sandwiching a decorative sheet along with the thermoplastic sheet-shaped resin extruded downwardly between said pair of rollers to attach the decorative sheet to the sheet-shaped thermoplastic resin using pressure.

18. The method for forming a resin molded article according to claim 1, wherein said feeding step by said rollers comprises a step of adjusting a gap between said pair of rollers so as not to generate a slip between the surfaces of said pair of rollers and the sheet-shaped resin.

19. The method for forming a resin molded article according to claim 13, wherein said core member is a cushion member made of a soft resin.

20. The method for forming a resin molded article according to claim 13, wherein said core member is a strengthening member made of a rigid resin.

21. The method for forming a resin molded article according to claim 1, wherein said step of forming the sheet-shaped resin is also carried out by pressurizing the sheet-shaped resin toward the mold.

22. A method for forming a resin molded article, characterized by comprising the steps of:
melting and kneading a thermoplastic resin;
storing a predetermined amount of the melted and kneaded thermoplastic resin;
extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed;
sandwiching the sheet-shaped resin between a pair of rollers arranged below the extrusion slit in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin;
feeding the resin downward at a feeding speed higher than, or equal to the predetermined extrusion speed by rotary driving of the rollers in such a manner that a relative difference in speed between the downward feeding speed of the sheet-shaped resin by the rotation of the pair of rollers and the extrusion speed of the sheet-shaped resin is reduced with time so as to cancel the thinning of the sheet-shaped resin caused by the draw-down or neck-in;
disposing the sheet-shaped molten resin, fed by the rollers, near a side of a mold arranged below the pair of rollers; and
forming the sheet-shaped resin in a shape conforming to a shape of the mold by depressurizing a sealed space formed between the sheet-shaped resin and the mold and/or pressurizing the sheet-shaped resin toward the mold.

23. A method for forming a resin molded article, characterized by comprising the steps of:
melting and kneading a thermoplastic resin;
storing a predetermined amount of the melted and kneaded thermoplastic resin;
extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed;
sandwiching the sheet-shaped resin between a pair of rollers arranged below the extrusion slit in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin;
feeding the resin downward at a feeding speed higher than, or equal to the predetermined extrusion speed by rotary driving of the rollers in such a manner that a relative difference in speed between the downward feeding speed of the sheet-shaped resin by the rotation of the pair of rollers and the extrusion speed of the sheet-shaped resin is reduced with time so as to make the thickness of the molten sheet-shaped resin uniform in the extruding direction;
disposing the sheet-shaped molten resin, fed by the rollers, near a side of a mold arranged below the pair of rollers; and
forming the sheet-shaped resin in a shape conforming to a shape of the mold by depressurizing a sealed space formed between the sheet-shaped resin and the mold.

24. A method for forming a resin molded article, characterized by comprising the steps of:
melting and kneading a thermoplastic resin;
storing a predetermined amount of the melted and kneaded thermoplastic resin;
extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed which is adjustable;
sandwiching the sheet-shaped resin between a pair of rollers arranged below the extrusion slit in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin;
feeding the resin downward at a feeding speed which is set to be higher than, or equal to the predetermined extrusion speed in accordance with the adjustable extrusion speed by rotary driving of the rollers;
disposing the sheet-shaped molten resin, fed by the rollers, near a side of a mold arranged below the pair of rollers; and
forming the sheet-shaped resin in a shape conforming to a shape of the mold by depressurizing a sealed space formed between the sheet-shaped resin and the mold and/or pressurizing the sheet-shaped resin toward the mold.

25. A method for forming a resin molded article, characterized by comprising the steps of:
melting and kneading a thermoplastic resin;
storing a predetermined amount of the melted and kneaded thermoplastic resin;
extruding the stored thermoplastic resin intermittently in a predetermined extrusion amount per unit time from an extrusion slit provided in a T-die and having a predetermined gap, such that the resin droops downward in a shape of a molten sheet, whereby the molten sheet-shaped resin having a predetermined thickness is extruded downwardly from the extrusion slit at a predetermined extrusion speed;
sandwiching the sheet-shaped resin between a pair of rollers arranged below the extrusion slit in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin;

feeding the resin downward at a feeding speed higher than, or equal to the predetermined extrusion speed by rotary driving of the rollers, while at the same time setting the gap of the pair of rollers to generate a force pressing the sheet-shaped resin against the pair of rollers so as not to generate a slip between the surface of the pair of rollers and the sheet-shaped resin;

disposing the sheet-shaped molten resin, fed by the rollers, near a side of a mold arranged below the pair of rollers; and forming the sheet-shaped resin in a shape conforming to a shape of the mold by depressurizing a sealed space formed between the sheet-shaped resin and the mold and/or pressurizing the sheet-shaped resin toward the mold.

* * * * *